June 15, 1948.　　　　　E. L. SCHMIDT　　　　　2,443,199
AIRWAY TRAFFIC CONTROL SYSTEM
Filed Oct. 4, 1945　　　　　　　　　　　　　　14 Sheets-Sheet 1

INVENTOR.
EDWIN L. SCHMIDT
BY
ATTORNEY.

June 15, 1948.  E. L. SCHMIDT  2,443,199
AIRWAY TRAFFIC CONTROL SYSTEM
Filed Oct. 4, 1945  14 Sheets-Sheet 2

INVENTOR.
EDWIN L. SCHMIDT
BY
ATTORNEY.

June 15, 1948. E. L. SCHMIDT 2,443,199
AIRWAY TRAFFIC CONTROL SYSTEM
Filed Oct. 4, 1945 14 Sheets-Sheet 4

INVENTOR.
EDWIN L. SCHMIDT
BY
ATTORNEY.

INVENTOR.
EDWIN L. SCHMIDT

June 15, 1948.  E. L. SCHMIDT  2,443,199
AIRWAY TRAFFIC CONTROL SYSTEM
Filed Oct. 4, 1945  14 Sheets-Sheet 6

FIG. 6

INVENTOR.
EDWIN L. SCHMIDT
BY
ATTORNEY.

INVENTOR.
EDWIN L. SCHMIDT
ATTORNEY.

June 15, 1948.    E. L. SCHMIDT    2,443,199
AIRWAY TRAFFIC CONTROL SYSTEM
Filed Oct. 4, 1945    14 Sheets-Sheet 10

INVENTOR.
EDWIN L. SCHMIDT
BY
ATTORNEY.

June 15, 1948.　　　　　E. L. SCHMIDT　　　　2,443,199
AIRWAY TRAFFIC CONTROL SYSTEM
Filed Oct. 4, 1945　　　　　　　　　　　14 Sheets-Sheet 11

INVENTOR.
EDWIN L. SCHMIDT
BY
ATTORNEY.

INVENTOR.
EDWIN L. SCHMIDT
ATTORNEY.

June 15, 1948.　　　　　E. L. SCHMIDT　　　　　2,443,199
AIRWAY TRAFFIC CONTROL SYSTEM
Filed Oct. 4, 1945　　　　　　　　　　　14 Sheets-Sheet 13

INVENTOR.
EDWIN L. SCHMIDT
BY
ATTORNEY.

June 15, 1948.  E. L. SCHMIDT  2,443,199
AIRWAY TRAFFIC CONTROL SYSTEM
Filed Oct. 4, 1945  14 Sheets-Sheet 14

| RANGE | PRINTER CODE | | | | | DIGIT | INDICATOR STORAGE CODE | | | | DIGIT | INDICATOR PULSING CODE | | | |
|---|---|---|---|---|---|---|---|---|---|---|---|---|---|---|---|
| | 1 | 2 | 3 | 4 | 5 | | 1 | 2 | 3 | 4 | | 1 | 2 | 4 | 7 |
| | | X | X | | X | 0 | | | | X | 0 | X | X | | X |
| OVER | X | X | X | | X | 1 | X | | | | 1 | X | | | |
| OUT-BOUND | X | X | | | X | 2 | | X | | | 2 | | X | | |
| IN-BOUND | X | | | | | 3 | X | X | | | 3 | X | X | | |
| ALTITUDE | | X | | X | | 4 | | X | | X | 4 | | | X | |
| TIME | | | | | X | 5 | | | X | | 5 | X | | X | |
| WIPE-OUT | X | | X | | X | 6 | X | | | X | 6 | | X | X | |
| | X | X | X | | | 7 | X | X | | | 7 | | | | X |
| | | X | X | | | 8 | | X | X | | 8 | X | | | X |
| | | | X | X | | 9 | | | X | X | 9 | | X | | X |
| REPEAT | X | | | X | | $ | | | | | | | | | |
| FLIGHT PLAN | | X | | X | X | ¢ | | | | | | | | | |
| MESSAGE | X | X | | | | — | | | | | | | | | |
| END MSG. | | | X | | X | £ | | | | | | | | | |
| SPACE | | | X | X | X | | | | | | | | | | |

FIG. 15

*INVENTOR.*
EDWIN L. SCHMIDT
BY
*ATTORNEY.*

Patented June 15, 1948

2,443,199

UNITED STATES PATENT OFFICE 2,443,199

AIRWAY TRAFFIC CONTROL SYSTEM

Edwin L. Schmidt, Kew Gardens, N. Y., assignor to The Teleregister Corporation, New York, N. Y., a corporation of Delaware Application October 4, 1945, Serial No. 620,290

19 Claims. (Cl. 177—353)

This invention relates generally to airway traffic communication and posting systems for transmitting and posting information or data in regard to a number of different aircraft, which information may be posted either by telegraph printers or by means of groups or rows of indicators which are automatically and selectively actuatable or settable in response to incoming signals to display information or current changes in information in regard to the aircraft, and is particularly applicable, although not limited, to a system for the transmission, recordation and posting of data, on announcement or bulletin boards, relating to air traffic control information, in which the signals representing the information thus posted may be transmitted either from a local transmitter or from wire or radio transmitters remotely situated with respect to the receiving, posting and recording apparatus, which remote transmitters may be located at ground stations or within aircraft in flight. The system disclosed herein represents in various respects an improvement over the communication and posting systems disclosed in the Marshall et al. Patent, No. 2,246,449, issued June 17, 1941, and in the copending applications of May et al., Serial No. 518,370, filed January 15, 1944, now U. S. Patent 2,386,743, granted October 9, 1945, Marshall et al., Serial No. 552,428, filed September 2, 1944, now U. S. Patent 2,391,469 granted December 25, 1945, and Schmidt, Serial No. 576,398, filed February 6, 1945, the disclosures of which, insofar as they are pertinent to the present invention, are incorporated herein by reference.

In systems for recording and posting flight plans and flight progress reports of aircraft and other messages relative to the control of aircraft, hereinafter referred to as air traffic control systems, the information thus posted by a printer or on a bulletin or announcing board usually relates to numerous flights, and when displayed by means of indicators on a flight progress board the items usually are arranged in groups according to the various "marker" or "fix" classifications, as explained in the aforesaid Marshall et al. patent, and preferably are arranged within each fix group in accordance with the expected or estimated time of passage or arrival of the aircraft at the various recording or marker points en route and at the airport.

The information posted may comprise numerous data, such as the flight designation symbols followed by a section number, if any; information as to the direction of the various flights both in-bound and out-bound; the airway traffic controller's estimated time when the aircraft will pass over or land at certain marker points on the flight route; the time the aircraft actually passes over or lands at each fix, or marker point; proposed altitudes at which a clearance has been issued to cross each fix or flight path; the altitude and time at which the aircraft actually crosses the various fixes. In addition to the foregoing, other information may be posted either by a printer or on a flight progress display board, such for example as an indication that a clearance through a fix or control zone has been issued; an indication of a flight over the airport; an indication of a stop en route, and the expected approach time; and an indication that an aircraft has been cleared to the airport control tower or range station so that there will be no unnecessary delay in landing.

In airway traffic control the country is divided into different geographical control areas, all flights within each of said areas being controlled by a flight control center individual to that area. For example, assume a flight which is scheduled to leave New York for Washington; the New York control area will extend a considerable distance around New York, and with respect the flight referred to would extend to Philadelphia which is the southern limit of the New York control area, Philadelphia thus providing a "boundary" fix for the New York area. Another control area also extends a considerable distance around Washington, and in the direction of New York will extend to Philadelphia, so that the Philadelphia fix will represent the "fringe" fix for the Washington control area in the case of a flight from New York to Washington. If the flight were in the opposite direction, i. e., from Washington to New York, Philadelphia would be the boundary fix of the Washington control area and the fringe fix for the New York control area. It will also be understood that there are other intervening fixes located along the flight route from New York to Washington, for example, at Newark and Baltimore. The system and apparatus disclosed herein are primarily for the purpose of facilitating proper control of flights by the posting of control data on electro-responsive storage devices and indicators, various of which operations are performed automatically.

Prior to the initiation of a flight, a flight plan is devised which tentatively establishes the time at which the flight is to leave New York, its altitude between various fix points en route, and the flight identifying number. The portion of this flight plan which relates to the flight while within the New York control area is transmitted to and posted on indicators in a flight information board at the New York control center. The portion of the flight plan which is within the Washington control area would be transmitted and posted on indicators in a flight information board located at the Washington control center. In order to limit the message transmission time it is desirable that data in regard to intervening fixes, such as Newark in the New York control area, be inserted automatically by the flight posting equipment at the New York control center. This can only be accomplished in the event that the altitude data for the intervening fix or fixes is the same as the altitude data for the "reference" fixes. The term "reference" is employed to signify the fixes which are incorporated in the message transmission, such as New York and Philadelphia in the instant example. The flight plan expander is designed to accomplish this feature, and will automatically insert in the Newark fix section of the New York board, the flight identification number and the altitude at which the plane is to fly over the Newark area.

In-bound and out-bound direction data in regard to the flight are stored and displayed at all the fix sections of the New York board to which the flight is pertinent so that when an "over" report is received with respect to a particular fix (meaning a report from the plane when over that fix) the preceding fix over which the flight previously passed may be automatically determined and the posting for such preceding fix section on the New York control center board automatically deleted. In the case of a boundary fix the out-bound direction, if displayed, is an indication that the flight is passing from the New York control area and into an adjacent control area, such as the Washington area. Any future postings on the boundary fix section will thereby be automatically retransmitted to the adjacent control area such as Washington, and any existing information posted in the boundary fix section will likewise be transmitted automatically to the Washington control center. If the flight were to terminate at Philadelphia, there would be no out-bound direction data posted in the Philadelphia fix section of the New York board, and hence the flight information posted in the Philadelphia fix section of the New York board would not be retransmitted on to a Philadelphia fix section of the Washington board.

A further feature is to save considerable transmission time by the use of a "repeat" character when data, for example, altitude, for a fix section is identical with such data for the preceding fix. In this case, it is undesirable to have to repeat such information in messages that are transmitted to the various fix sections of the New York board, and therefore the system is so adapted that abbreviated messages may be transmitted in which a single repeat character contained in the message will cause the same altitude or other data already posted in the New York fix section of the board to be similarly posted in the other fix sections of the New York board which are within the New York control area for the flight in question.

It is also desirable to automatically calculate and post the elapsed time required for the flight between two fix points thereby to avoid the necessity of having personnel make such calculations. Elapsed time between two fixes is important in estimating the time that a similar aircraft will require to fly over the same portion of the airway. Therefore, when an "over" posting is reported by a plane in regard to a fix over which the plane is flying, the elapsed time between the previous fix and the instant fix is automatically calculated and posted on the fix section of the New York board corresponding to the fix over which the report was made; concurrently therewith the flight information data in the preceding fix section is automatically deleted, thereby resulting in a saving of flight progress board posting space and effecting clarification of the posted data since the data posted in the preceding fix section is no longer of importance in connection with the flight in question.

One of the objects of the invention is a flight plan expander system which automatically initiates and inserts postings at an air traffic control center, of flight control data, for example, the flight identification and proposed altitude for intervening fixes along an airway, when the limiting fixes accompanied by a predetermined signal, such as a "flight plan" symbol, are contained in a message received at said air traffic control center.

Another object is the automatically initiation and insertion either of in-bound or out-bound direction data, or both, as a flight plan is posted for successive fixes along an airway.

A further object is a system in which the substitution of a predetermined signal, such as a "repeat" character, in a transmitted message automatically effects the posting on a flight progress board of the same data for the associated "range" and fix section as were posted for the same range on the preceding fix posting of the same message. The "range" indentifies the particular kind of data that is posted or is to be posted, for example, time, altitude or other data. Incoming messages to the flight progress board contain "range" code signals to identify the particular kind of data that follows so that it will be entered in the proper group of storage devices or indicators. This feature is especially useful during the transmission of flight plans when the same data, for example, a particular altitude, is to be posted for a plurality of fix points for the flight route, and eliminates the necessity for the sending operator to repeat identical, successive altitudes in such cases and substantially conserves transmission time.

Still another object is an automatic elapsed time calculator and posting apparatus which automatically posts the time in minutes consumed by an aircraft in passing from a particular fix to the succeeding fix along a specific airway. In airway traffic control procedure, it is customary for the control personnel to refer to the reported "over" times of an aircraft at succeeding fixes and make a calculation of the elapsed time between said fixes as an aid in estimating the time a similar aircraft will require to fly over the same portion of the airway. This time is in direct relation to existing weather conditions and is therefore variable. In order to provide the data for such calculations, it is at present necessary, when an "over" posting is made, to retain the "over" time posting at the previous fix section, in order that the two "over" times be available for elapsed time calculation. In the present invention, the automatic elapsed time calculator is combined with an automatic wipe-out feature to automatically calculate, and post, the elapsed time at a fix section where an "over" report is received, at the same time that the posting for the preceding fix along the airway is deleted, or wiped out. This results in a saving of flight progress board posting space, as well as increased efficiency due to the elimination of a time calculation by the control personnel.

An additional object is the automatic retransmission of flight information to an adjacent control area, which is initiated by the combination of a posting in a fix section of the flight progress board which represents the final posting on said board and an out-bound direction posting, giving an indication that the flight is to enter an adjacent airway traffic control area. The above mentioned last fix posting on a flight progress board, the so-called "boundary" fix, is also required, for control purposes, to be posted on the flight progress board of the adjacent traffic control area where it is known as the "fringe" fix. This posting at the "fringe" fix section of the board in the one area is accomplished by automatic retransmission of the data as posted at the "boundary" fix section of the board in the other area.

A further object is the provision for a special signal following a portion of a message, the reception of which special signal causes an automatic switching operation to transfer the incoming line signals from the flight progress board posting equipment to a distributor and teleprinter. This feature enables other information to be appended to the regular posting message for operation of a printer located at the airway traffic control center. In the event that the special signal precedes all other characters in a transmission, the entire message is reproduced on the teleprinter only, without affecting the flight progress board. Such messages, either appended to a regular posting message, or transmitted as an entity, usually consist of weather reports, requests for a change in clearance, and the like.

These and various other objects, advantages and improvements of the present invention will be apparent from the following detailed description of one illustrative embodiment of the invention, taken in connection with the accompanying drawings, in which:

Fig. 6 shows a flight locator rotary switch with associated control relays, and also the identification storage indicators and tap switches used in the flight locator circuits;

Fig. 13 is a diagram showing the arrangement of the various sheets of drawings illustrating the system;

Fig. 15 shows various permutation signal codes suitable for use with the system.

For the sake of simplicity, the detailed description of a system embodying the invention has been limited to the transmission, reception, storing and posting of but a few ranges of data on but a few fix sections of a flight progress display board; it is to be understood that in actual practice additional ranges of data, fix sections and the like are employed.

*Detailed description of flight plan expander and automatic direction inserter circuits*

Figure 1:
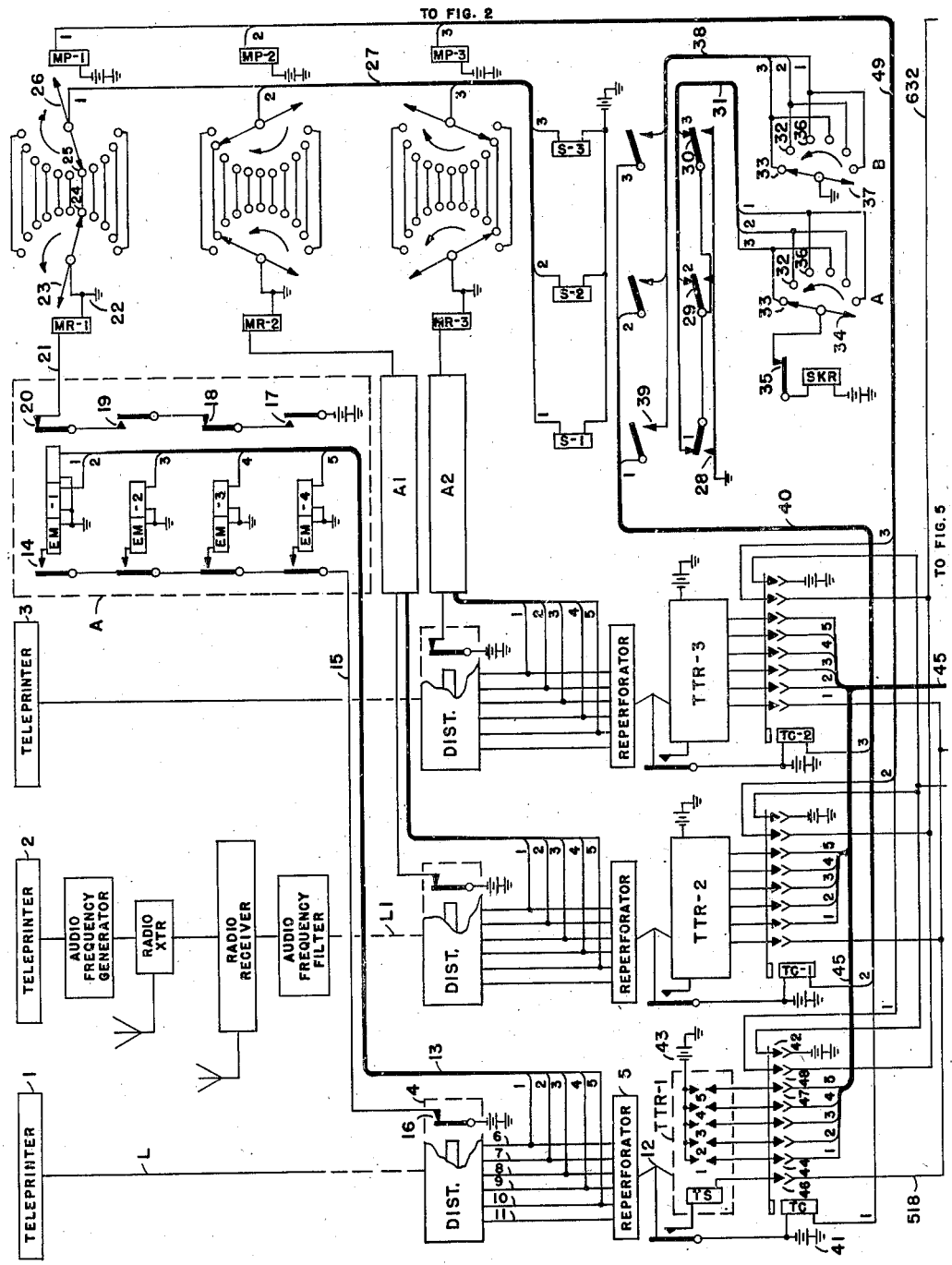
Fig. 1 is a view in diagrammatic form of certain transmitting and receiving apparatus including a seeker mechanism and message counting storage indicators suitable for use in the system of the invention.
Figure 14:
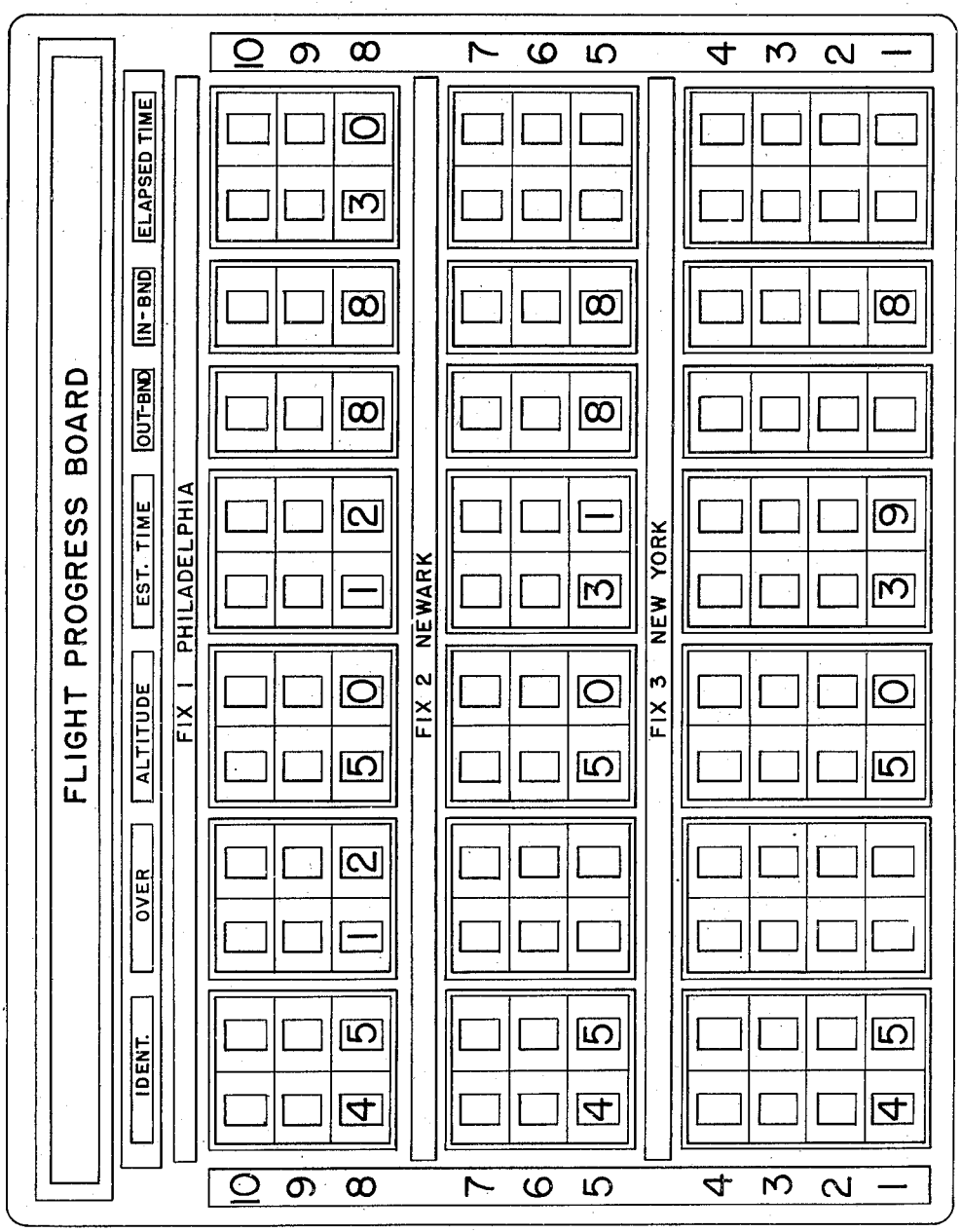
Fig. 14 illustrates an arrangement of the display board on which the flight control information is posted.

Assume that the flight progress board depicted in Fig. 14 is located at the New York control center, and that a message is transmitted from teleprinter 1, over line L, Fig. 1, which comprises a flight plan for a proposed flight of an aircraft from New York to Washington. It should be explained here that a flight plan is an advance notification from the pilot to the airway traffic control center containing information, such as the time and point of departure, the destination, and the proposed altitude at which the flight is to cruise. A flight may pass through a plurality of control areas and receives its clearance from the airway traffic control center in each area for the flight within that area. These instructions are subject to revision at any time under influence of changed weather or traffic conditions. In the present example, the message transmission of the flight plan may contain all of the fixes at which the flight should be posted on the New York flight progress board or, by utilizing the flight plan expander feature, the message may include the flight plan symbol, the "entry" fix for the New York control area, and the "boundary" fix for the New York control area, and the flight plan expander circuits will automatically function to post the intermediate fix sections of the New York flight progress board. As explained heretofore, the "boundary" fix for the New York control area (Philadelphia), is also the "fringe" fix for the Washington control area and is, therefore, posted on the Philadelphia fix section of flight progress boards in both New York and Washington. The flight plan symbol and abbreviated flight plan may be used only if the altitude data is to remain unchanged for the intermediate fix sections; if the altitude is to change at some intermediate fix, that fix and the changed data must be included as part of the transmitted message.

Assume that the message under consideration is a flight plan for flight 35, proposing to leave New York airport at 10:09, to cruise at 6000 feet. Assume further that the operator at teleprinter 1 has decided to use the abbreviated flight plan form of message, since the cruising altitude is to remain unchanged within the New York control area. The message transmitted may take the following form, 3553094.60&1$2.4L, in which the first two characters 35 transmitted represent the flight "identification" number; the third character 5 represents the range "time"; the fourth character 3 represents the fix New York; the fifth and sixth characters 09 represent the time data; the seventh character 4 represents the range "altitude"; the eighth character (.) represents a spacing character used when the fix is a repetition; the ninth and tenth characters 60 represent the data for the "altitude" range; the eleventh character & represents the "flight plan" symbol; the twelfth character 1 represents the fix Philadelphia; the thirteenth character $ represents the repeat symbol used when the altitude data is to be automatically repeated from the preceding fix posting; the fourteenth character 2 represents the range "out-bound direction"; the fifteenth character (.) represents a spacing character indicating repetition of the fix; the sixteenth character 4 represents the "out-bound" data; and the seventeenth and final character L represents the end-of-message signal. The functioning of the flight plan expander, as well as the automatic direction inserter, for the posting of this message on the New York flight progress board will now be described.

The teleprinter referred to above may be one of any of the well known types of telegraph printers suitable for the purpose such as, for example, what is known in the telegraph art as a 2B printer that records the signals on a tape in response to start-stop or simplex type signals, such signals being composed of marking and spacing line conditions comprising a start impulse followed by groups of permutations of five intelligence impulses in various combinations representing the characters to be transmitted or received, and each group being terminated by a rest impulse which is of opposite line condition to that of the start impulse. The actuation of any of the keys of the associated keyboard causes the transmission of signals representing the character assigned to each key.

The operation of the flight identification key 3 of teleprinter 1, causes a start signal to be applied to the line L in known manner, thereby starting operation of receiving distributor 4. This signal is followed by a five unit code permutation signal for the first digit (3) of the flight identification number, this signal having the code unit 1 thereof marking and the code units 2, 3, 4 and 5 spacing in character, Fig. 15, followed by a rest, or stop, signal. The operation of distributor 4 causes the marking and spacing code units 1, 2, 3, 4 and 5 of the intelligence signal to be transmitted to the tape perforator 5 over the conductors 6, 7, 8, 9 and 10 respectively. Following this, an impulse is transmitted in known manner by the distributor over conductor 11 to operate a punch magnet in the perforator and cause it to perforate the tape 12 issuing therefrom in accordance with the signals received and step the tape ahead into position for the next succeeding perforating operation corresponding to the second digit of the flight identification number. Since the permutation signal for the digit 3 has the code unit 1 only marking in character, conductor 6 is energized and conductors 7, 8, 9 and 10 are deenergized, thereby causing a single perforation corresponding to the code unit 1 to be made in the tape 12 at this time.

Conductors 6, 7, 8, 9 and 10 are connected by way of conductors 1, 2, 3, 4 and 5 of cable 13 to the windings of the end-of-message reading relays EM—1, EM—2, EM—3 and EM—4 respectively. Energization of conductor 6 causes relay EM—1 to operate by way of conductor 1, of cable 13. Relay EM—1 locks through its make contact and armature 14, to battery on conductor 15, supplied by the break contacts of the sixth pulse relay 16 of the distributor 4. The operation of relay EM—1 is without effect at this time, relay EM—1 releasing upon the subsequent operation of the sixth pulse relay of the distributor. In a similar manner, the signals corresponding to the digits 5, 5, 3, 0, 9, 4, ., 6, 0, &, 1, $, 2, 1, and 4, are received and stored in the perforated tape 12 and also cause the operation of the end-of-message relays EM—1 to EM—4 in code combination corresponding to each of the digits stored in the tape.

Immediately following the signal for the digit 4 is the end-of-message signal which, in the assumed example, is the signal representing the character L, having code units 1, 2 and 4 spacing and units 3 and 5 marking. This signal causes relays EM—2 and EM—4 to operate and lock to battery on conductor 15, and relays EM—1 and EM—3 to remain unoperated. Battery at armature 17 and make contact of relay EM—4 is extended to armature 18 and break contact of relay EM—3, armature 19 and make contact of relay EM—2, armature 20 and break contact of relay EM—1 and thence by way of conductor 21 to the winding of a storage unit MR—1 to ground. The storage unit may be of any suitable type, but preferably is a storage indicator such as disclosed in Haselton et al. Patent No. 2,155,825, issued April 25, 1939. Upon the release of relays EM—2 and EM—4 when the sixth pulse relay 16 operates, storage indicator unit MR—1 is stepped, or advanced, one position as its coil is again deenergized. Assuming no unposted messages for line L preceded the transmission just described, indicator unit MR—1 will now be one position in advance of the setting on the similar storage unit MP—1. Like terminals of the bank contacts of units MR—1 and MP—1 are connected together, so that whenever the two units are in agreement as to setting, a circuit is established from ground 22 over rotary wiper 23 of unit MR—1, thence by way of contact 24 of unit MR—1, contact 25 of MP—1, rotary wiper 26 of MP—1, conductor 1 of cable 27, to the winding of relay S1 and thence to battery. It will thus be apparent that, with no completed message awaiting posting, relay S1 is in its operated condition due to agreement of the associated indicator units MR—1 and MP—1. The message just transmitted has destroyed this agreement, since unit MR—1 was advanced one step as the end-of-message character was recorded on the EM relays. Relay S1 is therefore now in its unoperated condition.

As relay S1 released, ground by way of its break contacts 28 was applied to the armature and associated make springs 29 and 30 of relays S2 and S3 respectively, and thence over conductors 2 and 3, cable 31, to bank contacts 32 and 33 of rotary switch SKR. Rotary switch SKR is stepped through a circuit from ground on bank contact 33 of bank A, wiper arm 34, self-interrupting springs 35, and coil of switch SKR to battery. Bank position 36, however, is not grounded at this time, and the self-stepping circuit of switch SKR is interrupted at this point. With switch SKR positioned so that its associated wipers are resting on the contacts 36, a circuit is established over bank B to operate a transmitter connect relay TC. The path may be traced from ground on wiper 37 of bank B, through bank contact 36, thence by way of conductor 1, cable 38, through armature and break contacts 39 of unoperated relay S1, over conductor 1 of cable 40, winding of relay TC, to battery 41.

*Operation of distributor DR—1*

Figure 5:
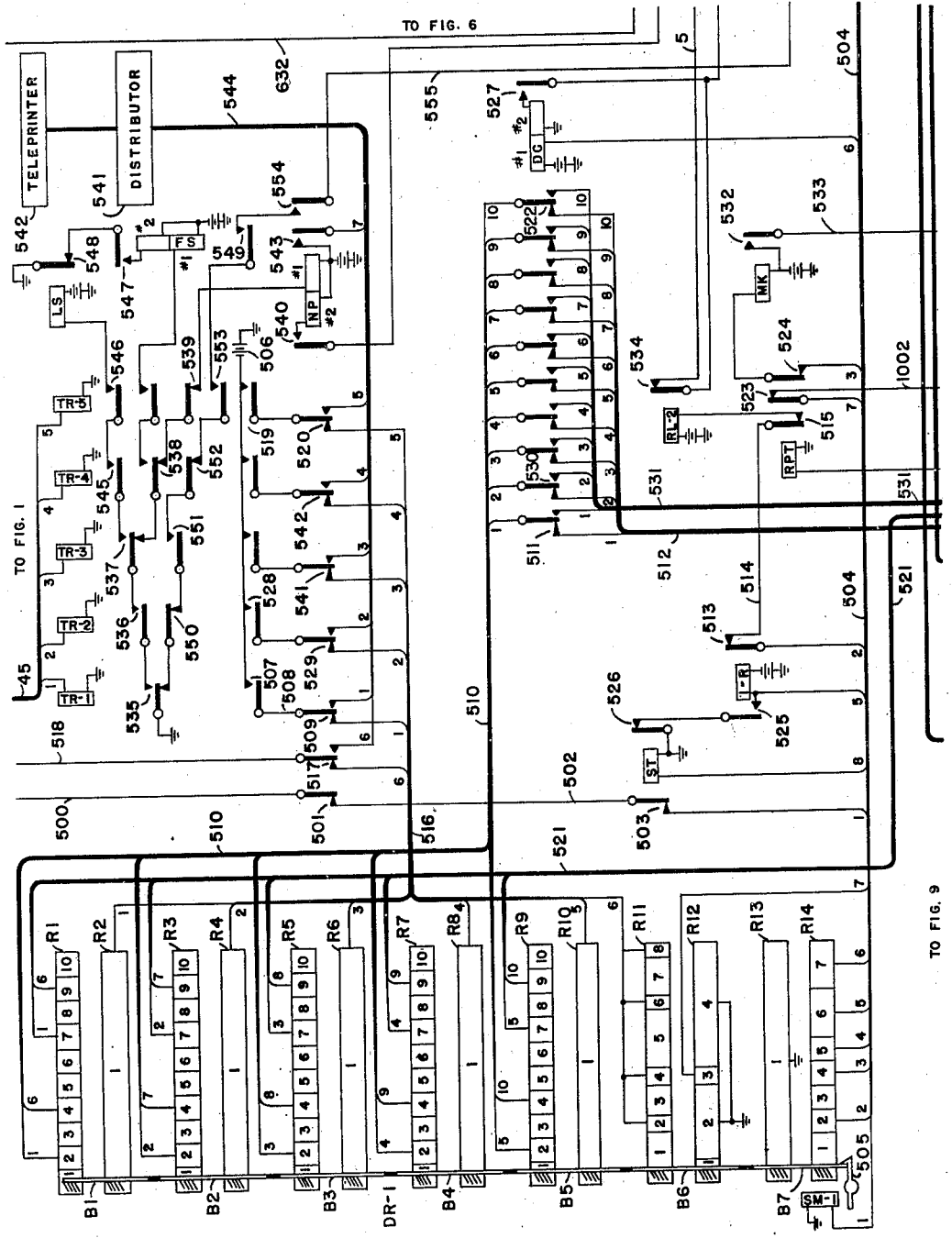
Fig. 5 illustrates reading relays controlled by signals received from the tape transmitter apparatus of Fig. 1, a receiving distributor under control of the reading relays, together with various control relays, and in diagrammatic form a distributor and receiving teleprinter used for the reception of messages which are not to be posted on the display board.

Relay TC, when operated, establishes a circuit to operate the clutch magnet SM—1 of distributor DR—1, Fig. 5. The path may be traced from battery on make contacts 42 of relay TC, Fig. 1, over conductor 500, Fig. 5, through break contacts 501 of unoperated relay NP, over conductor 502, through break contacts 503 of unoperated relay ST, over conductor 1 of cable 504, to the winding of the start magnet SM—1, to ground. Energization of the coil of SM—1 attracts latch 505, thereby setting the distributor DR—1 into operation. Relay TC operated, also closes circuits from tongues 1 to 5 of tape transmitter TTR—1 of Fig. 1 to relays TR—1 to TR—5 respectively, Fig. 5. The circuit from tongue 1 of TTR—1 may be traced from battery 43 through closed tongue 1 of tape transmitter TTR—1, through make contact 44 of relay TC, over conductor 1 of cable 45, to the winding of relay TR—1, to ground. Tongue 1 of tape transmitter TTR—1 will be the only tongue in the closed position at this time since the first digit of the flight identification number is 3. Therefore, relay TR—1 will be operated, and relays TR—2, TR—3, TR—4 and TR—5 will remain unoperated. The engagement of brush B1 of the distributor DR—1 with segment 2 of ring R1 closes a circuit from battery 506, through make contacts 507 of relay TR—1, over conductor 508, through break contacts 509 of unoperated relay NP, segment 1 of ring R2 of distributor DR—1, brush B1, segment 2 of ring R1, over conductor 1 of cable 510, through break contacts 511 of relay DC, over conductor 1 of cable 512, to the winding of relay 1I—1, Fig. 9, to ground. Relay 1I—1 operates and locks over its make contacts 900, conductor 4 of cable 901, to battery 600 on break contacts 601 of relay EM, Fig. 6.

Figure 9:
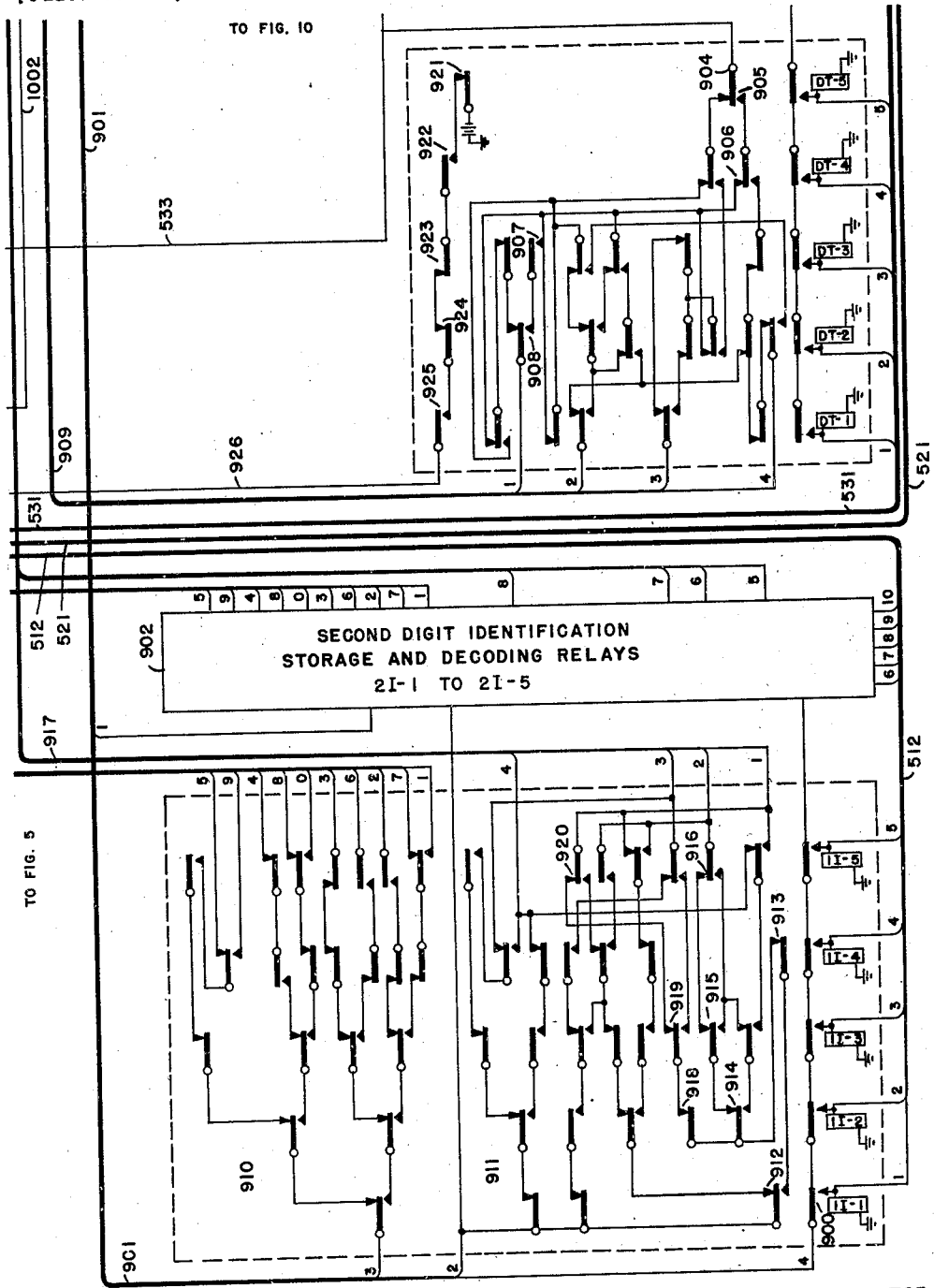
Fig. 9 shows the tens and units flight identification decoding and storage relay groups and the tens data decoding and storage relay group.

In a like manner, segment 2 of rings R3, R5, R7 and R9 and associated brushes B2, B3, B4 and B5 of distributor DR—1, Fig. 5, close circuits from make contacts on relays TR—2, TR—3, TR—4 and TR—5 to relays 1I—2, 1I—3, 1I—4, and 1I—5, respectively, Fig. 9. However, none of these relays is operated, since the first character perforation in the tape prevents all tongues of the tape transmitter TTR—1 except tongue 1 from engagement with their associated contacts.

When brush B7 contacts segment 2 of ring R14 on distributor DR—1, a circuit is established from ground on solid ring R13, through brush B7 and segment 2 of ring R14, over conductor 2 of cable 504, through break contacts 513 of relay 1—R, over conductor 514, through break contacts 515 of relay RPT, to the winding of relay RL—2, to battery. Operation of relay RL—2 has no effect at this time.

As the brushes of distributor DR—1 are disengaged from segment 2 of rings R1, R3, R5, R7 and R9, the circuits from the contacts of the TR relays to the first digit identification storage and decoding relays 1I—1 to 1I—5, are interrupted. When brush B6 engages segment 2 of ring R11 of the distributor DR—1, ground from segment 2 of ring R12 is applied by way of brush B6, segment 2 of ring R11, conductor 6 of cable 516, contacts 517 of relay NP, over conductor 518, through contacts 46 of operated relay TC, to the tape step magnet TS of tape transmitter TTR—1, to battery, thereby causing the tape stepping magnet to operate and step the tape to the position where the second character in the message is over the tape feeler pins. This second digit of identification 5, has the code unit 5 marking and units 1, 2, 3 and 4 spacing and therefore, relay TR—5 will now be operated and relays TR—1, TR—2, TR—3 and TR—4 will be unoperated.

As the brushes of the distributor DR—1 move into engagement with segments 4 of rings R1, R3, R5, R7 and R9, circuits are established from make contacts of relays TR—1 to TR—5 to the windings of the second digit identification storage relays 2I—1 to 2I—5, Fig. 9. The group of relays 2I—1 to 2I—5 is identical with the first digit relays 1I—1 to 1I—5 and is therefore indicated in diagrammatic form by the rectangle 902. Relay 2I—5 will be the only relay of the second digit identification group to operate. The circuits completing the path for operation of relay 2I—5 may be traced as follows. Battery 43, through closed tongue 5 of tape transmitter TTR—1, through contacts 47 of operated relay TC, over conductor 5 of cable 45, to the winding of relay TR—5, to ground. Relay TR—5 operated, closes a circuit from battery at its make contacts 519, through break contacts 520 of unoperated relay NP, over conductor 5 of cable 516, through segment 1 of ring R10 of distributor DR—1, brush B5, segment 4 of ring R9, over conductor 10 of cable 510, through break contacts 522 of unoperated relay DC, over conductor 10 of cable 512, to the winding of relay 2I—5, to ground. Relay 2I—5 locks over the same circuit as described above for the first digit identification group.

As brush B6 of the distributor DR—1 engages segment 4 of ring R11, ground is again applied to the step magnet TS of tape transmitter TTR—1, thereby advancing the tape 12 to the position where the next character perforations corresponding to the range 5, or "time," are over the feeler pins of the tape transmitter. The circuit may be traced from ground on break contacts 1001 of relay OB, Fig. 10, break contacts 1003 of relay IB, over conductor 1002, through break contacts 523 of relay RPT, Fig. 5, over conductor 7 of cable 504, to segment 3 of ring R12 on distributor DR—1, through brush B6 and segment 4 of ring R11, over conductor 6 of cable 516, through break contacts 517 of relay NP, over conductor 518, through make contacts 46 of relay TC, Fig. 1, to the stepping magnet TS of tape transmitter TTR—1, to battery.

Figure 10:
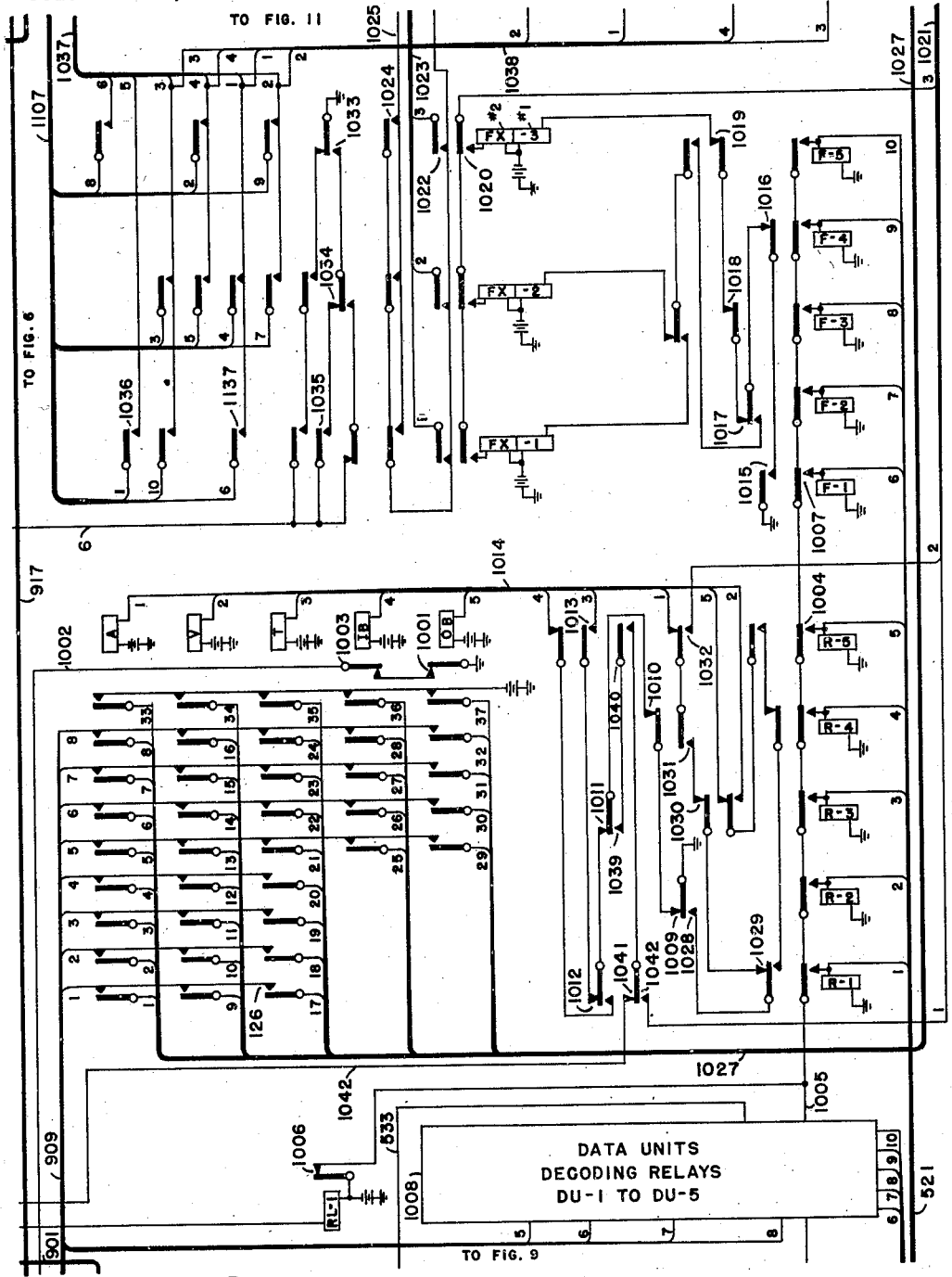
Fig. 10 illustrates the units data, range, and fix decoding and storage relay groups, range connect relays, and fix relays.

Engagement of segment 4, ring R14 of distributor DR—1 of Fig. 5, by brush B7 closes a circuit from ground on solid ring R13, through brush B7 and segment 4 of ring R14, over conductor 3 of cable 504, through break contacts 524 of relay RPT, to the winding of relay MK, to battery. Operation of relay MK has no effect at this time and relay MK releases as brush B7 leaves segment 4 of ring R14. In a like manner, relay RL—1, Fig. 10, is operated as brush B7 engages segment 5 of ring R14. Operation of relay RL—1 also has no effect at this time and relay RL—1 releases as brush B7 leaves segment 5 of ring R14. The circuit for operation of relay RL—1 may be traced from ground on distributor DR—1, solid ring R13, through brush B7 and segment 5 of ring R14, over conductor 4 of cable 504, to the winding of relay RL—1, to battery.

When brushes B1 to B5 of distributor DR—1 engage segments 7 of rings R1, R3, R5, R7 and R9, circuits are closed from make contacts on relays TR—1 to TR—5, to the windings of the range decoding relays R—1 to R—5, Fig. 10. Since the range character under consideration is the digit 5, relay R—5 only will be operated. The circuit may be traced from battery on make contacts 519 of operated relay TR—5 (which has re-operated over the identical circuit as described for the previous character), through break contact 520 of relay NP, over conductor 5 of cable 516, through segment 1 of ring R10, brush B5 and segment 7 of ring R9, over conductor 5 of cable 521, to the winding of relay R—5, to ground. Relay R—5 is operated and locks over its own make contacts 1004 and conductor 1005, to break contacts 1006 of relay RL—1, to battery.

As brush B6 contacts segment 6 of ring R11 on distributor DR—1, a circuit is again closed, in a manner similar to that hereinbefore described, to advance the tape to the position where the fourth, or fix character 3 (New York) is over the tape transmitter feeler pins. When brush B7 contacts segment 6 of ring R14, a circuit is established from grounded solid ring R13, through brush B7 and segment 6 of ring R14, over conductor 5 of cable 504, to the winding of relay IR, to battery. Relay IR operates and locks over its own make contacts 525, to break contacts 526 of relay ST, to ground. Relay IR operated, opens the operate circuit to relay RL—2 previously described, so that when distributor DR—1, brush B7 again contacts segment 2 of ring R14, relay RL—2 will not be operated, provided relay IR is in its operated condition. As brush B7 contacts segment 7 of ring R14, a circuit is established from grounded solid ring R13, through brush B7 and segment 7 of ring R14, over conductor 6 of cable 504, to the number one winding of relay DC, to battery. Relay DC operates and locks over its number two winding and own make contacts 527, over conductor 4, of cable 901, to break contacts 601 of relay EM, Fig. 6, to battery. Relay DC operated, transfers the circuits from segments 2 and 4 of rings R1, R3, R5, R7 and R9 of distributor DR—1 to the windings of the data tens and data units groups of translating relays DT—1 to DT—5 and DU—1 to DU—5, Figs. 9 and 10, so that the data characters will be stored on the relay groups on succeeding revolutions of the distributor brush arm.

As brushes B1 to B5 of distributor DR—1 contact segment 9 of rings R1, R3, R5, R7 and R9, the fix character 3 is stored on the F—1 relay of the fix decoding group, Fig. 10, over a circuit similar to that described for the range character. Relay F—1 is locked over its own make contacts 1007, to the same locking circuit as described for the range storage and decoding group.

As brush B6 contacts segment 8 of ring R11 on distributor DR—1, the tape stepping magnet of tape transmitter TTR—1 is again energized over a circuit similar to that previously described. At this point in the sequence of operations, the flight identification, first range, and first six characters have been stored on associated decoding relay groups, and the distributor DR—1 is about to make a second revolution during which the data for the previously stored range, a new range, and a new fix (or a spacing character denoting the absence of a new fix), are stored and decoded.

*Second revolution of distributor DR—1*

As mentioned heretofore, the operation of relay DC, Fig. 5, has transferred paths from the distributor segments used for the identification characters on the first revolution to the data storage relay groups. Therefore, as brushes B1 to B5 of distributor DR—1 again contact segment 2 of rings R1, R3, R5, R7 and R9, circuits in cable 531 are closed to operate relays in the DT, or data tens decoding relay group, Fig. 9. In the assumed example, the tens data character for the first range is the digit 0 having the code elements 2, 3 and 5 marking and the code elements 1 and 4 spacing in character. Relays DT—2, DT—3 and DT—5 of the data tens group will be operated and relays DT—1 and DT—4 will remain unoperated. The circuit for operation of relay DT—2 may be traced from battery on make contacts 528 of operated relay TR—2, Fig. 5, through break contacts 529 of relay NP, over conductor 2 of cable 516, to segment 1 of ring R4 on distributor DR—1, through brush B2 and segment 2 of ring R3, over conductor 2 of cable 510, through make contacts 530 of operated relay DC, over conductor 2 of cable 531, to the winding of relay DT—2, to ground. The DT relays are locked over the same path as described for the range decoding group of relays. In a similar manner, the units data character 9 is stored on the DU—4 and DU—5 data units decoding relays. The DU—1 to DU—5 relays are similar to the DT—1 to DT—5 relay group and are therefore shown in diagrammatic form as rectangle 1008, Fig. 10.

Returning to the point where range storage relay R—5 was operated, it will be noted that the operation of this relay has closed a circuit to operate range connect relay T, Fig. 10. The circuit may be traced from ground on break contacts 1009 of relay R—2, through break contacts 1010 of relay R—4, break contacts 1011 of relay R—3, break contacts 1012 of relay R—1, make contacts 1013 of operated relay R—5, over conductor 3 of cable 114, to the winding of relay T, to battery. Relay T operated, prepares a path for the operation of the T secondary data storage relays TTS—1 to TTS—4 and TUS—1 to TUS—4, Fig. 11, from the output circuits of the data decoding relay groups DT—1 to DT—5 and DU—1 to DU—5.

At the time fix decoding relay F—1, Fig. 10, was operated, a circuit was established from ground through make contacts 1015 of relay F—1, through break contacts 1016 of relay F—4, break contacts 1017 of relay F—2, break contacts 1018 of relay F—3, break contacts 1019 of relay F—5, to the number one winding of relay FX—3, to battery. Relay FX—3 operates and locks over its number two winding and make contacts 1020, over conductor 3 of cable 1021, to break contacts 1200 of relay RL—3, Fig. 12, to ground. Relay FX—3 operated, establishes a circuit from ground on break contacts 1201 of relay AWO, Fig. 12, over conductor 1 of cable 1202, through make contacts 1022 of operated relay FX—3, over conductor 3 of cable 1023, to bank contact 1100, bank A, of rotary switch RS—1, Fig. 11. The ground from break contacts 1201 of relay AWO, over conductor 1 of cable 1202, is also connected by means of make contacts 1024 of operated relay FX—3, over conductor 1025, through break contacts 1101 of relay CO—1, Fig. 11, interrupter springs 1102 of rotary switch RS—1, to the winding of rotary switch RS—1, to battery. Rotary switch RS—1 proceeds to step on self-interrupted pulses until wiper 1103 of bank A contacts bank contact 3, at which point the ground circuit on bank contact 3 is extended by means of wiper 1103 to the winding of relay CO—1, to battery. Relay CO—1 operates and at its break contacts 1101, opens the stepping circuit for rotary switch RS—1, which comes to rest with its wiper arms positioned to the bank contacts associated with the fix in question, viz. fix 3 (New York).

Returning to the operation of distributor DR—1, it will be recalled that the tens and units data characters have been stored on associated relay groups during the second revolution of the distributor. As brush B7 of distributor DR—1 contacts segment 4 of ring R14, relay MK is operated over a circuit which has been described. Relay MK operated, closes a circuit from battery on make contacts 532 of the relay, over conductor 533, to the apex of the pyramidal circuits on relay group DT—1 to DT—5, Fig. 9, and relay group DU—1 to DU—5, Fig. 10. The foregoing operation establishes circuits, through operated range connect relay T, Fig. 10, to operate secondary data storage relays in the groups TTS—1 to TTS—4 and TUS—1 to TUS—4 of Fig. 11. It will be recalled that the digit 0 was stored on the DT—1 to DT—5 relay group, resulting in the operation of relays DT—2, DT—3, and DT—5. With these relays operated, and battery supplied to the apex of their pyramidal contacts as described above, relays TTS—1, TTS—2, and TTS—4 are operated. The circuit for the operation of relay TTS—1 may be traced from battery on spring 904 of relay DT—5 as described above, through make contact 905 of relay DT—5, break contacts 906 of relay DT—4 make contacts 907 of relay DT—3, make contacts 908 of relay DT—2, over conductor 1 of cable 909, through make contacts 1026 of operated relay T, over conductor 17 of cable 1027, to the winding of relay TTS—1, to ground. Relay TTS—1 operates and locks over its make contacts 1104 and conductor 7 of cable 1021, to break contacts 1203 of relay RL—3, to battery. Over similar circuits, relays TTS—2, TTS—4 of the tens time data and storage group and relays TUS—2 and TUS—4 of the units time data storage group, are operated and locked.

As the operation of distributor DR—1 continues and brush B7 contacts segment 5 of ring R14, relay RL—1 again operates over a circuit previously prescribed. Operation of relay RL—1 at this time opens the locking circuit for relays in the range, data and fix decoding groups of relays at break contacts 1006 of relay RL—1. Any of the range, data and fix decoding relays which were operated are now released in preparation for the reception of the next succeeding message characters. Release of the range decoding relays at this time opens the operate circuit for range connect relay T, which releases. At the completion of the second revolution of distributor DR—1, the range character 4 (altitude) and the spacing character ( . ) have been stored on the R1 to R5 and F1 to F5 groups of relays respectively, Fig. 10, in a manner previously described.

*Third revolution of distributor DR—1*

During the third revolution of distributor DR—1 the data for the "altitude" range is decoded and stored on the ATS—1 to ATS—4 and AUS—1 to AUS—4 groups of altitude data storage relays, the flight plan character & is stored on the R1 to R5 decoding relay group and the second fix character in the message 1 (Philadelphia) is stored on the F—1 to F—5 decoding relay group.

Figure 12:
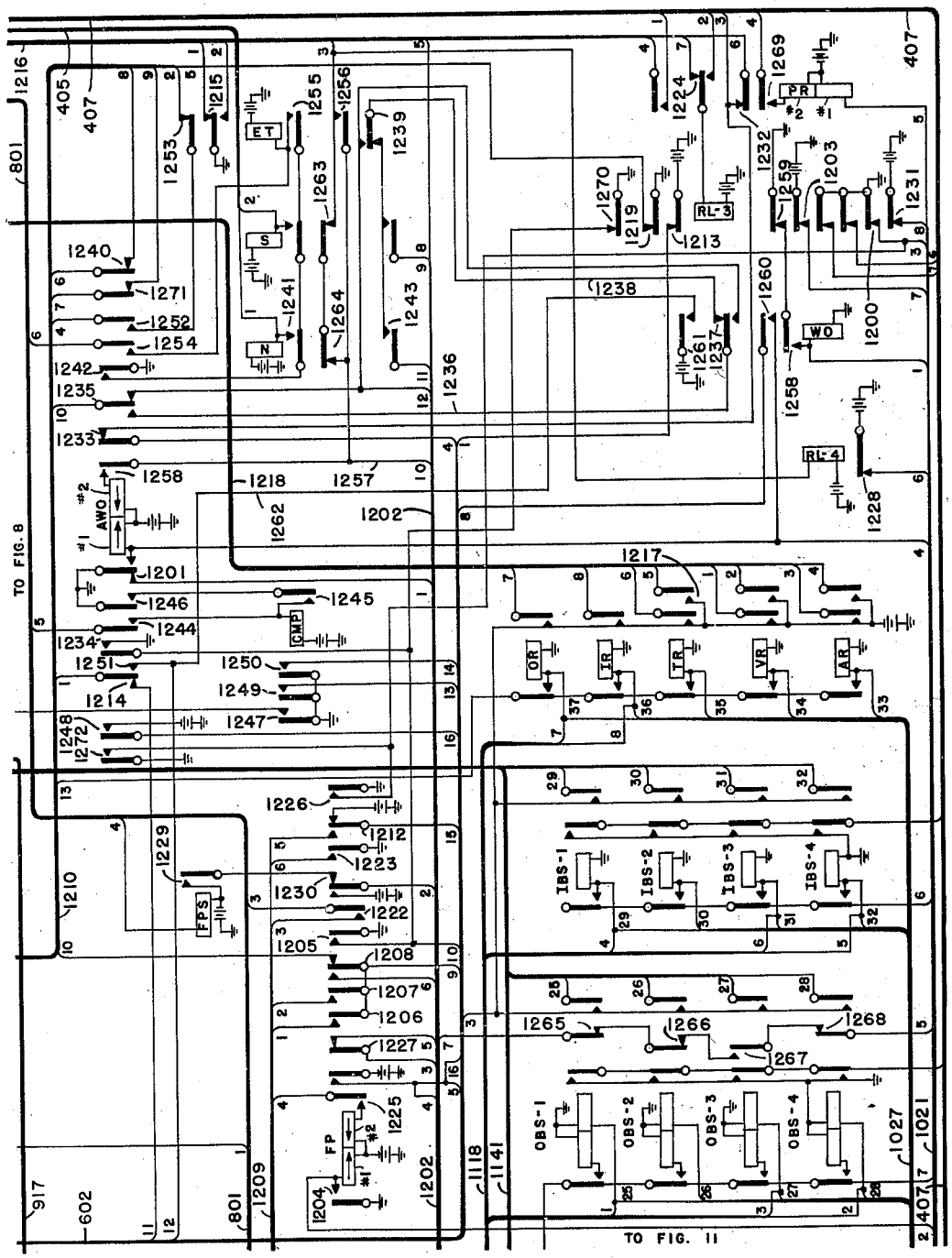
Fig. 12 shows the remainder of the secondary data storage relay groups in addition to certain automatic wipe-out and control relays.

Storage of the flight plan character & on the range decoding group of relays has caused the operation of relays R—2, R—4 and R—5 in accordance with the code for this character and established a circuit from ground on make springs 1028 of relay R—2, through break springs 1029 of relay R—1, break springs 1030 of relay R—3, make springs 1031 of relay R—4, make springs 1032 of relay R—5, over conductor 2 of cable 1021, to the number one winding of relay FP, Fig. 12, to battery. Relay FP operates and locks over its own contacts 1204, to ground.

Over a circuit similar to that described before, the storage of the second fix character 1 (Philadelphia) on relays F1, F2, F3 and F5 causes the operation of FX—1 (Philadelphia) fix relay. It will be recalled that relay FX—3 was operated and locked by a prior operation so that at this point in the cycle of operations both FX—1 and FX—3 relays are operated and a circuit is established from ground on make springs 1033 of relay FX—3, through break springs 1034 of relay FX—2, make springs 1035 of relay FX—1, over conductor 6 of cable 602, to the winding of relay PST, Fig. 6, to battery. Relay PST operates and locks over its make contacts 603 and conductor 10 of cable 602, to ground on make springs 1205 of operated relay FP and to break springs 1270 of relay RL—3, to ground. Relay PST operated, establishes a circuit from battery on its make contacts 604, over conductor 8 of cable 504, to the winding of relay ST, Fig. 5, to ground. Relay ST operated, opens the circuit to the clutch magnet SM—1 of distributor DR—1 at break contacts 503 of relay ST, and opens the locking circuit for relay 1—R at break contacts 526 of relay ST. With the clutch magnet SM—1 de-energized, distributor DR—1 will come to rest at the end of the third revolution as the brush arm is engaged by the latch 505.

*Flight plan expander and automatic direction inserter*

At this point in the cycle of operations, all of the characters in the message necessary for the first posting operation have been received. The reception of the two fix points on relays FX—3 and FX—1 has established the direction of flight between said fix points, and the reception of the two fix points and the flight plan symbol has established the airway and the limits over which the flight plan expander is to operate. The operation of the flight plan expander and the automatic direction inserter will now be described.

As relay PST of Fig. 6 operated, a circuit was established from ground on make contacts 605 of relay PST, over conductor 9 of cable 602, to armature springs 1206, 1207, and 1208 of operated relay FP, Fig. 12. Ground on springs 1208 of relay FP is extended over conductor 6 of cable 1202, to wiper 1105 of bank F on rotary switch RS—1, Fig. 11, through bank contact 1106 of rotary switch RS—1, over conductor 1 of cable 1107, through make contacts 1036 of operated relay FX—1, over conductor 5 of cable 1037 to bank contact 1106 of bank A on rotary switch RS—2, Fig. 11. Ground from make contacts 1207 of operated relay FP is extended over conductor 2 of cable 1206, through break contacts 1109 of relay CO—2, through interrupter springs 1110 of rotary switch RS—2, to the winding of rotary switch RS—2, to battery. Rotary switch RS—2 is thereby stepped over self-interrupted pulses until wiper arm 1111, of bank A, contacts the grounded bank contact 1108. At this point, the ground on bank contact 1108 is extended over wiper arm 1111 to the winding of relay CO—2, to battery. Relay CO—2 is operated and locks over its make contacts 1126 and conductor 6 of cable 1209, to make contacts 1223 of operated relay FP, to ground. Relay CO—2 operated, opens the stepping circuit for rotary switch RS—2 at break contacts 1110 of relay CO—2. Switch RS—2 is thereby positioned to condition the first posting on the New York flight progress board in accordance with the received flight plan.

As relay CO—2 operated, ground was extended from make contacts 1112 of relay CO—2, over conductor 1113, to the wiper arms 1114 and 1115 of banks C and D of rotary switch RS—2. The ground on wiper arm 1114 of bank C is extended over bank contact 1116 of bank C and conductor 3 of cables 1037 and 1038, to the winding of relay SO, Fig. 11, to battery. Relay SO is operated and establishes a circuit from battery on break contacts 800 of relay AG, Fig. 8, over conductor 1 of cable 801, through make contacts 1117 of operated relay SO, over conductor 3 of cable 1118, to the winding of relay OBS—3, Fig. 12, to ground. Relays OBS—1 to OBS—4, Fig. 12, are the secondary data storage relays for the out-bound direction range. An additional circuit is established by the operation of relay SO which causes the operation of out-bound data restoration relay OR, Fig. 12. The circuit may be traced from battery on break contacts 800 of relay AG, Fig. 8, over conductor 1 of cable 801, through make contacts 1119 of operated relay SO, over conductor 7 of cable 1118, to the winding of relay OR, to ground. Relay OBS—3 operated, locks over its own contacts and conductor 7 of cable 1021 to battery on break contacts 1203 of relay RL—3, Fig. 12. Relay OR operated, locks over its own make contacts and conductor 3 of cable 1210 to battery on break contacts 1211 of relay AG.

The operation of relays OBS—3 and OR just described will result in the posting of the digit 4 in the out-bound range of the first fix posting made on the flight progress board during the subsequent posting operation to be described. The direction digits are assigned to correspond to points of the compass so that, starting with northeast as the digit 1 and progressing clockwise, the digit 4 represents south direction and the digit 8 would represent north direction. For purposes of simplification, only the north and south direction circuits have been shown on the drawings.

Figure 11:
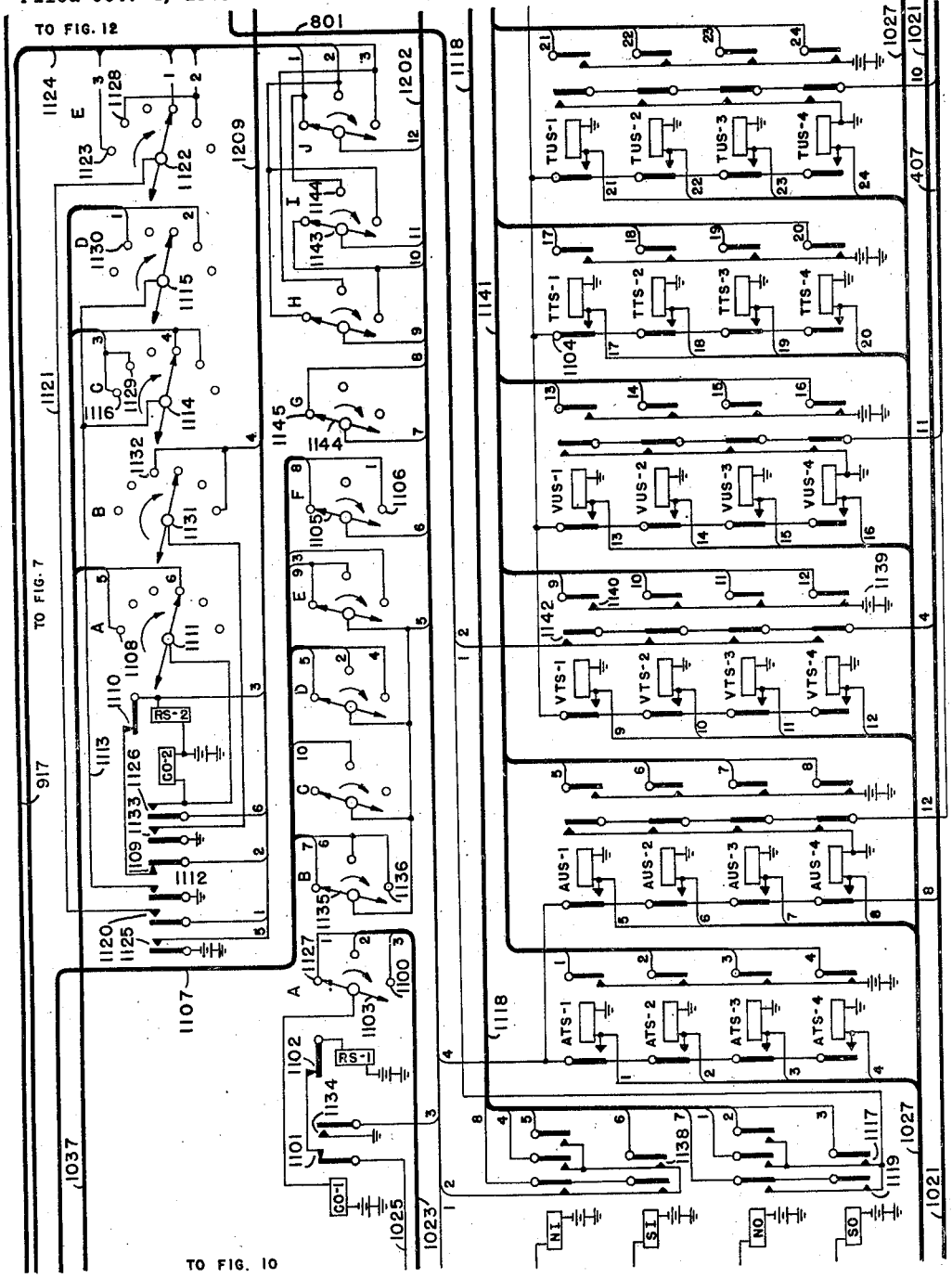
Fig. 11 shows a portion of the secondary data storage relay groups, and rotary switches associated with the flight plan expander circuits.

Returning to the operation of relay CO—2 of Fig. 11, it will be noted that the ground furnished to contacts 1206 of relay FP, Fig. 12, is extended over conductor 1 of cable 1209, through make contacts 1120 of operated relay CO—2, over conductor 1121, to wiper arm 1122 of bank E on rotary switch RS—2, through bank contact 1123 of bank E, over conductor 3 of cable 1124, to the number 3 contacts of manually settable tap switches FS—1 to FS—10, Fig. 6. These tap switches are associated with corresponding rows of display information on the flight progress board and are manually settable to one of three positions corresponding to the three indicated fix displays. As indicated on Fig. 6, switches FS—1 and FS—2, corresponding to indicator rows 1 and 2 of the display board, are turned to position 3, corresponding to fix 3, or New York.

The operation of relay CO—2 has also established a circuit from battery at make contacts 1125 of operated relay CO—2, over conductor 5 of cable 1209, through make contacts 1212 of operated relay FP, over conductor 15 of cable 602, through make contacts 605 of relay VS, Fig. 6, break contacts 607 of relay AGR, make contacts 608 of relay PST, to bank contact 609 of bank A on flight locator rotary switch RS, Fig. 6. Bank contact 609 is the homing, or idle, position of the rotary switch, and therefore wiper arm 610 of the rotary switch will be positioned on this contact. The battery connection to bank contact 609 is extended by means of the wiper arm 610, through self-interrupting springs 611 and the winding of switch RS, to ground. Switch RS proceeds to step from its homing position under control of the self-interrupting contact springs 611. As wiper arm 610 contacts bank positions 2 to 10, a battery connection is made over conductor 612, through break contacts 613 of relay AGR, break contacts 614 of relay VS, to battery 615. It is thus evident that, with relay CO—2 operated, switch RS will step on self-interrupted pulses until either relay AGR or relay VS operates and opens the stepping circuit at break contacts 613 on relay AGR, or 614 on relay VS.

The flight locator circuits under consideration are designed so that a search is made for agreement of flight identification digits as between existing displays on the associated fix section and the new identification information as stored on the pyramids 910 of the first and second groups of storage and decoding relays, 1I and 2I, Fig. 9. In order to effect this comparison, all flight identification digits displayed on the flight progress board are duplicated on associated storage indicator units of suitable type, such as disclosed in the aforesaid Patent 2,155,825. These storage indicator units are shown on Fig. 6 as ITS—1 and IUS—1 to ITS—10 and IUS—10, units ITS—1 and IUS—1 being associated with the tens and units digits of identification displayed on the Number 1 row of the flight progress board. The search for agreement is initiated at the lowest numbered row assigned to the fix section in question and progresses upward until identification agreement is found on a row assigned to the fix section, or a row is reached in which the tens digit of identification storage is blank. If agreement is found, relay AGR, Fig. 6, is operated; if a vacant space is reached, relay VS is operated.

Returning to the present example, it will be noted on Fig. 14 that row 1, assigned to the New York fix section of the flight progress board is occupied by a flight posting having a different identification than the one in the incoming message, and that row 2, also assigned to the New York fix section, is blank. The manually settable tap switches for rows 1 and 2 will be positioned to contact 3, corresponding to the fix 3, or New York, section of the display board. While rotary switch RS is positioned to bank contacts associated with row 1, a circuit will be established to search for agreement of identification as stored on the 1I and 2I relay groups and the displayed information in row 1 as indicated on storage indicator units ITS—1 and IUS—1. Since agreement is not established on row 1, rotary switch RS begins its stepping action and next contacts bank position 2. The storage indicators ITS—2 and IUS—2 are in the blank position, indicating a vacant space in row 2 of the display board. A circuit is established from contact 3 of tap switch FS—2 over conductor 2 of cable 616, bank D, contact 617 and wiper 618 of switch RS, wiper 619 and bank C, contact 620 of switch RS, conductor 2 of cable 621, wiper 622 of indicator ITS—2, contact BL of indicator ITS—2, conductor 623, to the number one winding of relay VS, to ground. Relay VS locks over its number two winding and make contacts 627, over conductor 1 of cable 602 to battery on break contacts 1213 of relay RL—3, Fig. 12. The action of switch RS is stopped by the operation of relay VS, and switch RS is positioned so that its wiper arms are resting on the associated Number 2 bank contacts.

Figure 2:
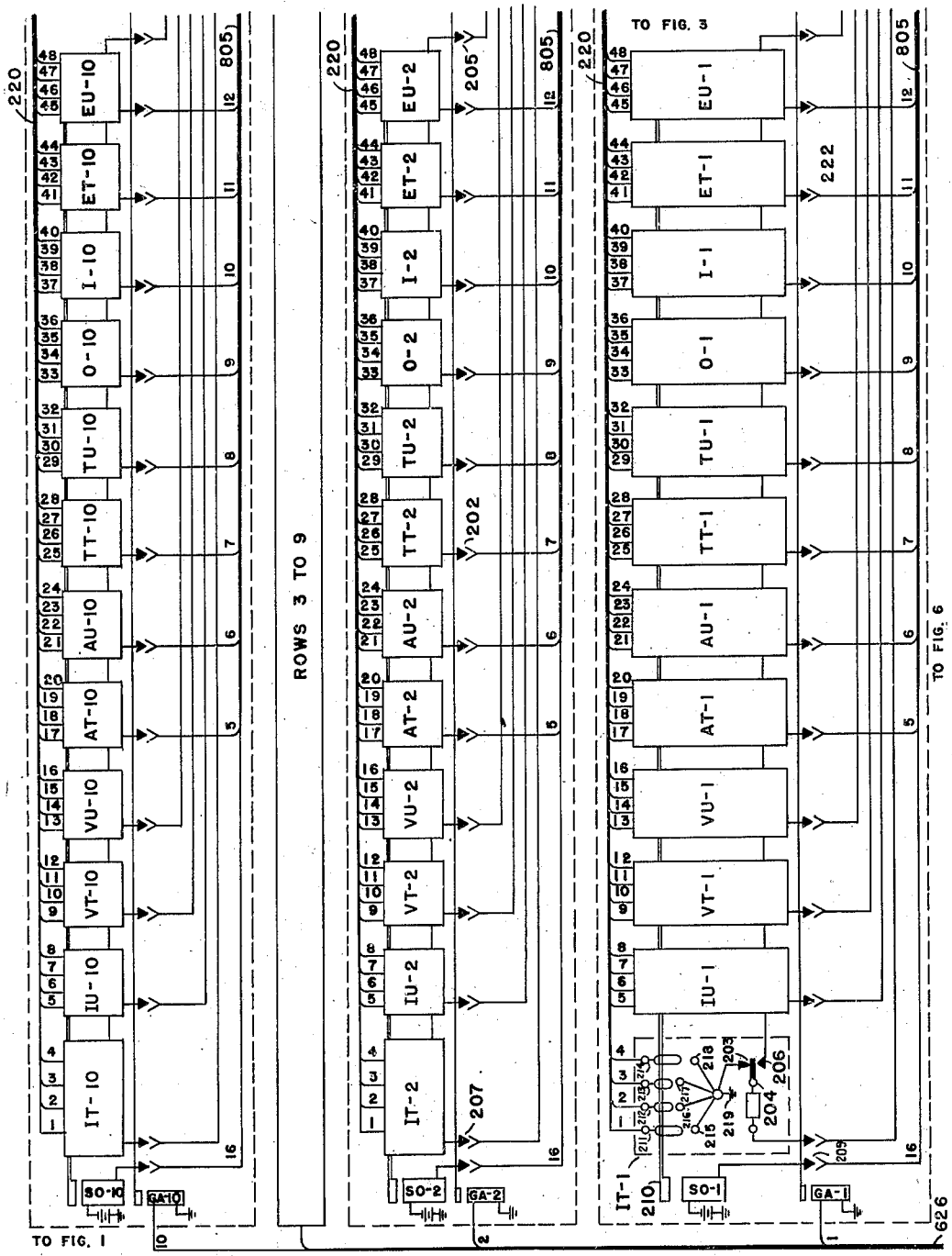
Fig. 2 is a diagrammatic representation of a portion of the announcing or display board containing storage display indicators with associated solenoid mechanisms and gang connect relays.

The operation of relay VS establishes a circuit from battery on make contacts 624 of relay VS, through wiper arm 625 and bank contact 2 of bank E on rotary switch RS, over conductor 2 of cable 626 to the winding of gang connect relay GA—2, Fig. 2, to ground. Relay GA—2 is therefore operated and connects, by means of its make contacts, the pulsing multiple to the display indicators in row 2 of the flight progress board, Fig. 2, through cable 201 to the storage indicator units ITS—2 and IUS—2 of Fig. 6, and through cable 200 to the storage indicator units VTS—2 and VUS—2, Fig. 7.

At this point, all preliminary storage and row selection operations for the first fix section posting have been completed and the actual pulsing operation of the indicators in row 2 of the display board can be initiated. It will be noted that, in addition to the posting of information contained in the transmitted message, the outbound direction of the flight at the first fix section has been automatically determined and stored in readiness for posting concurrently with the received information relating to said fix section.

*Operation of distributor DR—2*

Figure 8:
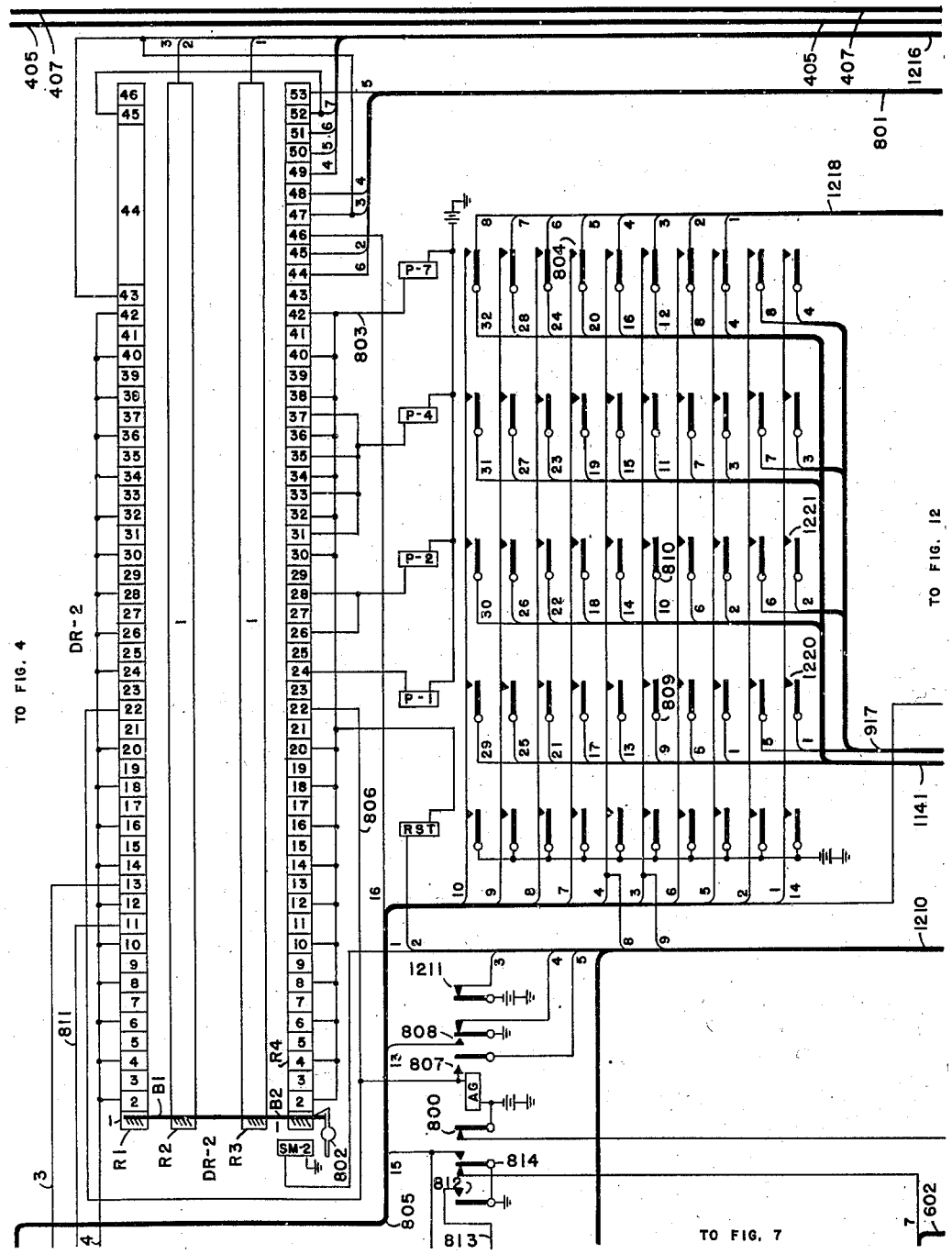
Fig. 8 illustrates a pulse distributor with associated pulsing and control relays.

The operation of relay VS establishes a circuit from battery on make contacts 628 of relay VS, over conductor 2 of cable 602, over conductor 11 of cable 602, through break contacts 1214 of relay AWO, over conductor 1 of cable 1210, to the winding of start magnet SM—2, associated with pulsing distributor DR—2, Fig. 8, to ground. The operation of start magnet SM—2 disengages the latch 802 from the brush arm, thereby setting distributor DR—2 in operation. As brush B2 of distributor DR—2 passes even numbered segments 2 to 20 of ring R—4, ten pulses are transmitted to relay P7. The circuit may be traced from ground on armature and break springs 1215 of relay ET, Fig. 12, over conductor 1 of cable 1216, to solid ring R3 of distributor DR—2, through brush B2 and segment 2 of ring R4, conductor 803 to the winding of relay P7, to battery. The ten pulses to relay P7 at this time serve to restore to the blank position any previous display which may appear on the indicators of the selected ranges, A, T and OB, of the selected row. In the present example, a blank row has been selected for the posting operation since the flight in question has not been posted previously and therefore the circuit for the above-mentioned ten restoration pulses will be open at the switching contacts of the indicator units. The circuit to the TT—2 indicator, Fig. 2, may be traced from battery on make contacts 1217 of operated relay TR, over conductor 5 of cable 1218, through make contacts 804 of relay P7, over conductor 7 of cable 805, through make contacts 202 of relay GA—2, Fig. 2, winding of display storage indicator TT—2, break contacts (not shown) of display storage indicator TT—2 (like the break contacts 203 of storage indicator IT—1 in row one) where the circuit is open. Restoration circuits to the other selected indicators are also open since all indicators in row 2 are assumed to be in their blank positions at this time. The display storage indicators shown in row 2 are identical to the unit designated IT—1, and therefore all except this unit are shown in diagrammatic form. These units, which preferably are like the unit disclosed in Haselton et al., Patent 2,302,769 issued November 24, 1942, are unresponsive to restoration pulses when in the blank position due to the interruption of their pulsing circuits by the switching contacts 203 and 204 which are disengaged from each other when the indicators are at their blank settings.

When the brush B1 contacts segment 22 of ring R4 of distributor DR—2, a circuit is closed from ground on break springs 1215 of relay ET, over conductor 1 of cable 1216 and ring R3 of distributor DR—2, through brush B2 and segment 22 of ring R4, over conductor 806, to the winding of relay AG, to battery. Relay AG operates and locks over a circuit through its make contacts 807 and conductor 5 of cable 1210, to break contacts 1219 of relay RL—3, to ground. Relay AG operated, opens the operate and lock circuits for relay OR at its break contacts 800 and 1211 respectively, and also opens the lock circuit for relays TR and AR at its break contacts 1211. Relays OR, TR and AR release and open the battery circuits to contacts of the P7 relay. Relay AG operated, at its make contacts 808, applies ground over conductor 13 of cable 805, through contacts 205 of relay GA—2, to all contacts 206 of the indicators in row 2 of the display board. This latter circuit replaces the ground connection which is opened by contacts 203 and 204 of the indicators when they are in the blank position and thus allows any units which may now receive pulses to step from the blank position. The manner in which indicator units IT—2, IU—2, AT—2, AU—2, TT—2, TU—2, O—2 and identification storage indicator units ITS—2 and IUS—2, Fig. 6, are actuated from their blank setting to display the selected digits will now be described.

As the distributor brush B2 passes over the group of segments 24 to 42 of ring R4, a single impulse may be generated from relay P1, two impulses from relay P2, four impulses from relay P4, and seven impulses from relay P7. If an indicator is to be set to display the digit 1, the relay P1 only is employed, if the digit 2 is to be displayed relay P2 only is employed, relays P1 and P2 being employed to display the digit 3. The digit 4 is selected for display on an indicator by the relay P4, the digit 5 by the relays P1 and P4, the digit 6 by relays P2 and P4. When the digit 7 is to be displayed, relay P7 alone is employed. The digit 8 is obtained from relays P1 and P7, the digit 9 from relays P2 and P7 and the digit 0 from relays P1, P2 and P7. The setting of the tens digit identification indicators will now be described.

It will be recalled that the first character, the tens digit of identification (3) received from the incoming line, caused the operation of relay II—1, Fig. 9, under control of the distributor DR—1, and reading relay TR—1, Fig. 5. With relay II—1 operated, a battery connection is established from battery on break contacts 629 of relay AGR, Fig. 6, over conductor 2 of cable 901, through make springs 912 of operated relay 1I—1, Fig. 9, through break springs 913 of unoperated relay 1I—4, where the circuit branches to two paths: One path may be traced through break springs 914 of unoperated relay 1I—2, break springs 915 of unoperated relay 1I—3, break springs 916 of unoperated relay 1I—5, to conductor 2 of cable 917. The second path may be traced through break springs 918 of relay 1I—2, break springs 919 of relay 1I—3, break springs 920 of relay 1I—5, to conductor 1 of cable 917. The battery connection to conductor 1 of cable 917 is terminated at the armature of the make spring combination 1220 on relay P—1, Fig. 8, while the battery connection to conductor 2 of cable 917 is terminated at the armature of the make spring combination 1221 on relay P—2, Fig. 8. It will be noted that the battery circuits just described are closed only if relay AGR, Fig. 6, is unoperated. If relay AGR is operated, it is an indication that the flight identification digits as received in the incoming message are already posted on the display board and therefore it is unnecessary to reset the identification indicators. As relay P—1 operates once, and relay P—2 is operated twice, under control of pulse distributor DR—2 of Fig. 8, it will be apparent that three battery pulses will be transmitted to conductor 1 of cable 805, through make contacts 1220 on relay P—1 and make contacts 1221 on relay P—2. Conductor 1 of cable 805 is connected by means of make contacts 207 of operated relay GA—2 to the winding of display board indicator IT—2, Fig. 2, and by means of make contacts 208 of operated relay GA—2 and conductor 4 of cable 201 to the winding of storage indicator ITS—2, Fig. 6. Thus, these indicators receive three battery pulses and are positioned thereby to display the digit 3 corresponding to the tens digit of flight identification. The units digit of flight identification indicators are positioned to display the digit 5 over similar circuits under control of the 2I—1 to 2I—5 group of storage relays, Fig. 9.

Over similar circuits, the AT—2, AU—2, TT—2, TU—2 and O—2 storage display indicators of Fig. 2 are pulsed to their respective settings under control of the secondary data storage relays ATS—2, ATS—3, AUS—1, AUS—2, AUS—4, TTS—1, TTS—2, TTS—4, TUS—2, TUS—4, Fig. 11, and OBS—3, Fig. 12.

As brush B2 of distributor DR—2, Fig. 8, contacts segment 47 of ring R4, a circuit is completed from ground as hereinbefore described to ring R3, through brush B2 and segment 47 of ring R4, over conductor 3 of cable 201, through make contacts 1222 of operated relay FP, over conductor 3 of cable 1209, to the winding of rotary switch RS—2, Fig. 11, to battery. Thus, as brush B2 of distributor DR—2 leaves segment 47 of ring R4, rotary switch RS—2 is advanced one step as its coil is again deenergized. As brush B2 of distributor DR—2 contacts segment 52 of ring R4, a circuit is established from grounded ring R3, through brush B2 and segment 52 of ring R4, over conductor 7 of cable 1216, through break contacts 1224 of relay PR, Fig. 12, to the winding of relay RL—3, to battery.

Relay RL—3 operated, opens the locking circuit to relays AG, VS, TTS—1, TTS—2, TTS—4, TUS—2, TUS—4, and OBS—3, which release at this time. Note that, although the locking circuit for relays FX—1 and FX—3 is opened by the operation of relay RL—3, a supplementary locking ground has been applied by make contacts 1226 of relay FP operated, so that relays FX—1 and FX—3 remain operated over this supplementary locking circuit. Also, the secondary data storage relays for the altitude range, ATS—2, ATS—3, AUS—1, AUS—2 and AUS—4, Fig. 11, remain locked over conductor 4 of cable 1202, over conductor 5 of cable 602, through break contacts 534 of relay RL—2, Fig. 5, break contacts 601 of relay EM, Fig. 6, to battery. At this point in the cycle of operations, the first fix section (New York) has been posted on the display board in accordance with the received information in the incoming message, and gang connect relay GA—2 has released as relay VS opened its operate circuit at make contacts 624 on relay VS. The release of relay VS also opened the circuit to the start magnet SM—2 on distributor DR—2 so that the brush arm will become engaged with latch 802 and come to rest at this time. The secondary data storage relays for the altitude range and the tens and units identification storage relays remain operated over locking circuits hereinbefore described. The operations which automatically result in the posting of the intervening fix section (Newark, fix 2) will now be described.

*Automatic posting of intervening fix sections*

It will be recalled that as distributor DR—2 neared the end of its operation, rotary switch RS—2, Fig. 11, was advanced one step. Wiper 1122 of switch RS—2 will, therefore, now be positioned to contact 1128 of bank E and a circuit similar to that hereinbefore described is established to mark all #2 contacts on the tap switches FS—1 to FS—10, Fig. 6. Bank contact 1129 of bank C on switch RS—2 is connected to the same circuit as bank contact 1116 and therefore relay SO will be re-operated over a circuit previously described. As before, relay SO operated establishes circuits to operate the out-bound secondary data storage relay OBS—3, in readiness for the posting of south out-board direction at the next fix section posting to be made on the display board. Since wiper 1115 of bank D on rotary switch RS—2 is now positioned to contact 1130, a circuit is established from ground on make contacts 1112 of operated relay CO—2, over conductor 1113, through wiper arm 1115 and bank contact 1130, over conductor 1 of cables 1037 and 1038, to the winding of relay SI, Fig. 11, to battery. Relay SI operates and establishes a circuit to operate the in-bound secondary storage data relay IBS—3 over a circuit similar to that described for the OBS—3 relay. The in and outbound directions have thus automatically been established and stored in readiness for the posting at the intervening, or Newark, fix section.

In a manner similar to that described previously, the flight locator switch RS is operated and selects the first row in the Newark fix section of the display board. As shown on Fig. 14, the tap switches, Fig. 6, for rows 5, 6 and 7 would be turned to position 2, and row 6 is the first vacant row in this section. Relay VS and relay GA—6 will therefore be operated and the posting of the tens and units identification, the tens and units altitude, the out-bound direction and the in-bound direction digits will now be made in row 6 of the display board under control of distributor DR—2 and the secondary data storage relays. It will be noted that the selection of the fix section, Newark, was under control of the flight plan expander and was made automatically from the limits established by the incoming message information. Also, the automatic direction inserter circuits have caused the posting of both out and in-bound directions at the fix section selected.

As brush B2 of distributor DR—2, Fig. 8, again contacts segment 47 of ring R4, rotary switch RS—2 is again advanced one step over a circuit previously described. As wiper arm 1131 on bank B of switch RS—2 contacts bank contact 1132, a circuit is established from ground on make contacts 1133 of relay CO—2 to wiper arm 1131 and contact 1132, bank B, over conductor 4 of cable 1209, through make contacts 1225 of relay FP, Fig. 12, to the #2 winding of relay FP, to battery. Relay windings #1 and #2 of relay FP are differentially connected with respect to each other so that, with both windings energized, the resulting magnetic fields are opposed and relay FP is thereby caused to release. As relay FP releases, it opens, at its make contacts 1223, the locking circuit for relay CO—2; at its make contacts 1207, the stepping circuit for rotary switch RS—2; and at its make contacts 1206, the circuit for marking the tap switches FS—1 to FS—10 with ground through bank E of rotary switch RS—2. Release of relay FP also opens one locking circuit to relays PST, FX—1, and FX—3. These relays remain locked over an additional locking source at break contacts of relays RL—3. As relay FP releases, it also established a circuit from ground through make contacts 1134 of operated relay CO—1, over conductor 3 of cable 1232, through break contacts 1227 of unoperated relay FP, over conductor 5 of cable 1202, to wiper arms on banks B, C, D and E of rotary switch RS—1, where it is extended to conductors 3, 4 and 6 of cable 1107. The circuit for conductor 6 may be traced from ground (as traced above) on wiper arm 1135 of bank B on switch RS—1, through bank contact 1136, over conductor 6 of cable 1107, through make contacts 1137 of operated relay FX—1, Fig. 10, over conductor 1 of cable 1038, to the winding of relay SI, Fig. 11, to battery. Relay SI is operated and will condition the final posting at fix 1 (Philadelphia), to display the inbound direction digit.

As brush B2 of distributor DR—2 contacts segment 47 of ring R4, a circuit is established from ground on ring R3, through brush B2 and segment 47 of ring R4, over conductor 3 of cable 1216, to the winding of relay RL—4, Fig. 12, to battery. Relay RL—4, in operating, opens the locking circuit for the relays IBS—1 to IBS—4 at break contacts 1223 of relay RL—4. Relay IBS—3 which had been operated to condition the posting of the in-bound direction at fix 2, is thereby released.

As brush B2 of distributor DR—2 contacts segment 48 of ring R4, a circuit is established from ground on ring R3, through brush B2 and segment 48 of ring R4, over conductor 4 of cable 801, to the winding of relay FPS, Fig. 12, to battery. Relay FPS operates and at its make contacts 1229 establishes a circuit from battery through break contacts 1230 of relay FP, over conductor 2 of cable 1202, through make contacts 1138 of operated relay SI, Fig. 11, over conductor 6 of cable 1118, to the winding of relay IBS—3, Fig. 12, to ground. Relay IBS—3 is operated and locks over its make contacts and conductor 6 of cable 1021, to break contacts 1228 of relay RL—4, to battery. Relay IBS—3 operated will condition the posting of 4, (south) digit in the inbound range of the final (Philadelphia) fix posting.

As relay RL—3 of Fig. 12 again operates from segment 52 of ring R4 on distributor DR—2, through conductor 7 of cable 1216, relays VS, PST, Fig. 6, OBS—3, Fig. 12, FX—3, Fig. 10, and AG, Fig. 8, are released. Note that although the locking circuit for relay FX—1 of Fig. 10 is opened by the operation of relay RL—3, relay FX—1 remains operated since its #1 coil is still energized over the circuit from the pyramidal contacts of the F—1 to F—5 group of fix decoding relays. As relay FX—3 releases, the circuit holding relay CO—1 of Fig. 11 operated is interrupted at make contacts 1022 of relay FX—3. Relay CO—1 releases and re-establishes, at its break contacts 1101, the stepping circuit for rotary switch RS—1. Rotary switch RS—1 proceeds to step over a circuit similar to that previously described, with the exception that it is now positioned under control of relay FX—1 instead of relay FX—3. As wiper arm 1103 of bank A on rotary switch RS—1 contacts grounded bank contact 1127, relay CO—1 is again operated, stopping switch RS—1 at this point. The foregoing operation has served to position switch RS—1 where it now will be used to control the final fix posting on the display board. At this point, the New York (fix 3) and Newark (fix 2) sections of the display board have been posted in accordance with the received information and the flight plan expander circuits have performed their functions. The posting of the final fix section (Philadelphia) will now be described.

*Posting the final fix section*

Returning to distributor DR—1, Fig. 5, it will be recalled that its operation was stopped following the end of the third revolution of the brush arm by the release of start magnet SM—1 as relay ST was operated from make contacts of operated relay PST, Fig. 6. The remaining characters in the tape 12 of Fig. 1, which have not been recoded, are the repeat character $, the out-bound range digit 2, the space digit (.), the out-bound data digit 4, and the end-of-message signal Ł. When relay RL—3 operated as the distributor DR—2 completed its operation, relay PST was released, opening the operate circuit for relay ST at break contacts 604 of relay PST. The release of relay ST re-established the operate circuit for start magnet SM—1 of distributor DR—1. Start magnet SM—1 is energized, attracting latch 505 and setting the brush arm of distributor DR—1 in motion.

In a manner similar to that hereinbefore described, the repeat character $ is stored on the tens data decoding relay group DT—1 to DT—5, Fig. 9. Storage of the character $ on the DT relay group has caused the operation of relays DT—1 and DT—4 in accordance with the code for this character. A circuit is thereby established from battery on break contacts 921 of relay DT—5, through make contacts 922 of relay DT—4, break contacts 923 of relay DT—3, break contacts 924 of relay DT—2, make contacts 925 of relay DT—1, over conductor 926 to the winding of relay RPT, to ground. Relay RPT is operated and at its break contacts 515 opens the operate circuit for relay RL—2 so that the locking circuit to secondary data storage relays ATS—2, ATS—3, AUS—1, AUS—2 and AUS—4 will not be opened as brush B7 of distributor DR—1 contacts segment 2 of ring R14. Relay RPT operated also opens, at its break contacts 524, the operate circuit to relay MK, and at its break contacts 523, the stepping circuit to tape transmitter TTR—1, Fig. 1, from segment 3 of ring R12 on distributor DR—1. Thus, relay RPT in operating, conditions the secondary altitude data and tape transmitter stepping circuits for a repetition of the previous altitude data posting.

As the distributor DR—1 continues its operation, the out-bound range character 2 and the space character (.), are decoded and stored in known manner and relay LR is re-operated from segment 6 of ring R14. During the final revolution of the brush arm, the out-bound data character 4 is stored on the OBS—3 secondary data storage relay and the end-of-message character L is stored on the range decoding relay group of relays R—1 to R—5, Fig. 10. Relays R—3 and R—5 of this group will be operated in accordance with the code for character L, and establish a circuit from ground through break contacts 109 of relay R—2, break contacts 110 of relay R—4, make contacts 139 of operated relay R—3, make contacts 140 of operated relay R—5, break contacts 141 of relay R—1, over conductor 142 to the winding of relay EM, Fig. 6, to battery. Relay EM operates and locks over the same circuit as that previously described for locking relay PST. The operation of relay EM establishes a circuit from ground on make contacts 631 of relay EM to the winding of relay PST, to battery. Relay PST is operated thereby, and by means of its make contacts, closes circuits previously described to start the flight locator action, and the resulting distributor DR—2 action, to post the fix 1 (Philadelphia) section of the flight progress board in accordance with the stored data. It will be noted that, in this instance, the tap switches FS—1 to FS—10 are marked with ground under control of rotary switch RS—1, thereby conditioning the flight locator to select a vacant row in the fix 1 (Philadelphia) section of the display board. The operation of relay EM has opened one locking circuit to relay DC and to the first and second digit identification relay groups 1I—2 to 1I—5 and 2I—1 to 2I—5 at break contacts 601 of relay EM; these relays, however, remain locked over a circuit from battery at break contacts 1231 of relay RL—3, over conductor 8 of cable 121, conductor 4 of cable 1202, conductor 5 of cable 602, through break contacts 534 of relay RL—2, to the #2 winding of relay DC, and over conductor 4 of cable 901, to the first and second digit identification decoding relay groups.

As brush B2 of distributor DR—2 contacts segment 51 of ring R4, a circuit is established from grounded ring R3, through brush B2 and segment 51 of ring R4, over conductor 6 of cable 1216, through break contact 1232 of relay PR, break contacts 1233 of relay AWO, over conductor 4 of cable 602, through make contacts 630 of operated relay EM, over conductor 632, through make contacts 48 of operated relay TC, Fig. 1, over conductor 1 of cable 49, to the winding of storage indicator unit MP—1, to battery. Unit MP—1 is thereby advanced one position as brush B2 of distributor DR—2 leaves segment 51 of ring R4, and is again brought into agreement with storage indicator unit MR—1, Fig. 1, causing relay S—1 to reoperate over a circuit previously described. As relay S—1 reoperates, relay TC is released and the circuits from tape transmitter TTR—1 are disconnected from the common reading circuits of Fig. 5.

At this point, the posting of the assumed flight plan message has been completed, and when relay RL—3 operates from segment 52 of ring R4 on distributor DR—2, locking circuits to the various operated relays are opened and the equipment is returned to normal in readiness for the reception of another incoming message.

*Automatic "elapsed time" calculator, and associated posting and automatic wipe-out circuits*

Assume that the pilot of northbound flight 45, shown posted on row 1 of the New York fix section, row 5 of the Newark fix section, and row 8 of the Philadelphia fix section, on the New York display board, Fig. 14, transmits a message, which is received over line L1, Fig. 1, and which comprises an "over" report at the Newark fix. The message would assume the following form, 451231L, in which the first two characters 45, represent the flight identification digits; the third character 1, represents the range "over"; the fourth character 2, represents the fix 2, or Newark; the fifth and sixth characters 31, represent the "over" data digits; and the seventh and final character L, represents the end-of-message signal. In effect, flight 45 is reporting over the Newark fix at 31 minutes after the hour. As explained heretofore, the equipment and circuits of the invention will decode the received message and effect automatic operations which will: (1) post the time digits 31 in the "over" range of the posting for flight 45 displayed in row 5 of the Newark fix section of the New York display board; (2) compare the received "over" time 31 at Newark with the previous "over" time 12 which is displayed in row 8 of the Philadelphia fix section of the New York display board, calculate the difference between these two times, and display the resultant 19 in the "elapsed time" range of the display in row 5 of the Newark fix section of the display board; and (3) effect an automatic wipe-out of the previous posting in row 8 of the Philadelphia fix section of the display board.

The decoding, storing and posting operations of the assumed message are similar to operations already described and therefore will not be repeated. Assume that these operations have reached the stage where distributor DR—2, Fig. 8, is nearing the end of its operation and brush B2 is about to contact segment 45 of ring R4. At this point, the "over" time 31 will have been posted on the "over" range of the display indicators in row 5 of the Newark fix section of the display board. Note that, as these indicators were actuated to their settings under control of the secondary data storage relays VTS—1 to VTS—4 and VUS—1 to VUS—4, Fig. 11, storage indicator units VTC and VUC, Fig. 7, were also actuated to identical settings. The circuit for the tens digit indicator may be traced from make contacts of the VTS—1 and VTS—2 relays, which will have operated to store the digit 3 for the tens of "over" time posting. Battery 1139, is connected through make contacts 1140 of operated relay VTS—1, over conductor 9 of cable 1141 to armature contact 809 of relay P1, Fig. 8. Over a similar circuit, battery is connected by operated relay VTS—2 to armature contact 810 of relay P2, Fig. 8. As relay P1 pulses once, and relay P2 pulses twice, under control of pulse distributor DR—2, three pulses will be transmitted to conductor 3 of cable 805, and to conductor 9 of cable 1210. Conductor 3 of cable 805 is connected by means of operated relay GA—5, Fig. 2, to the display indicator unit VT—5 of row 5 on the display board. Conductor 9 of cable 1210 is connected through break contacts 1271 of relay AWO, over conductor 7 of cable 1210 to the winding of storage indicator unit VTC, Fig. 7.

Figure 7:
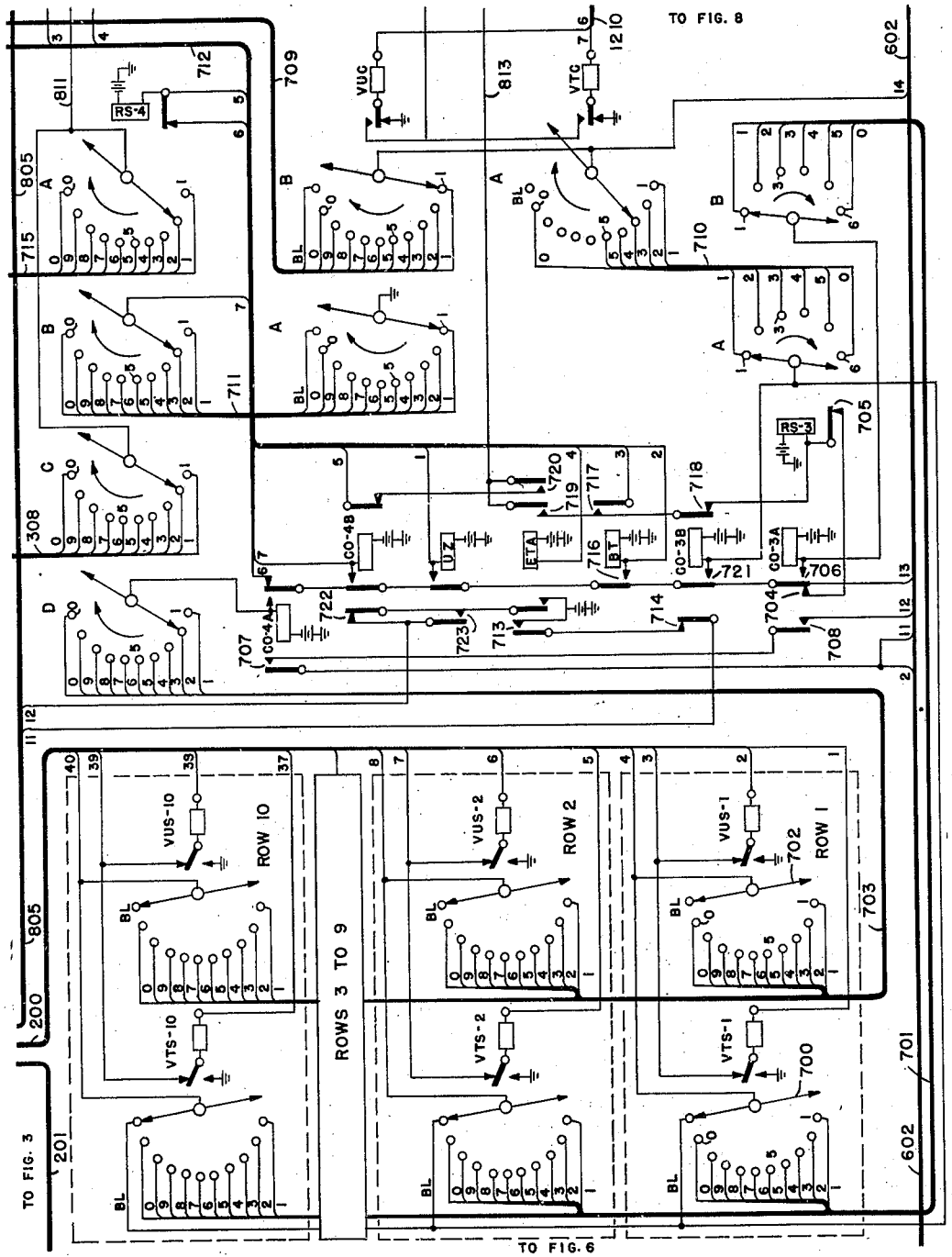
Fig. 7 shows the "over" range storage indicators, rotary switches and associated control relays used for the elapsed time calculator circuits.

Over similar circuits, storage indicator unit VUC, Fig. 7, is pulsed in parallel with the units "over" range display indicator in row 5 of the display board. Storage indicator units VTC and VUC are preferably, although not necessarily, of the type disclosed in Haselton et al. Patent No. 2,155,825, issued April 25, 1939. It will be apparent that indicator units VTC and VUC are always actuated to display the latest "over" range posting made on any row of the display board. In the present example, these units will display the digits 31 corresponding to the "over" time as received in the incoming message.

As brush B2 of distributor DR—2 contacts segment 45 of ring R4, a circuit is established from grounded ring R3, through brush B2 and segment 45 of ring R4, over conductor 2 of cable 801, through make contacts 1142 of operated relay VTS—1, Fig. 11, over conductor 4 of cable 1021, to the #1 winding of relay AWO, Fig. 12, to battery. Relay AWO is operated and locks over its make contacts 1201, to ground. Relay AWO, at its break contacts 1201, opens the operate circuit to relay CO—1, Fig. 11. Relay CO—1 releases and, at its contacts 1134, opens the marking circuit to relays NI, SI, NO and SO. Relay AWO operated, at its make contacts 1234, adds a supplementary locking ground to relays EM and PST, Fig. 6, preventing their release when relay RL3 of Fig. 12, operates. Relay AWO operated, at its break contacts 1214, opens the operate circuit to start magnet SM—2 of distributor DR—2 so that the distributor brush arm will come to rest at the completion of the revolution in progress. Relay AWO operated, at its break contacts 1233, opens the circuit to step seeker storage indicator unit MP—2, Fig. 1, thereby preventing the line seeker of Fig. 1 from being freed as distributor brush B2 contacts segment 51 of ring R4. Relay AWO operated, at make contacts 1252, establishes a circuit from ground on break contacts 808 of relay AG, over conductor 4 of cable 1210, through make contacts 1252 of operated relay AWO, break contacts 1253 of relay ET, over conductor 2 of cable 1210, to the winding of relay RST. Relay RST will generate 10 restoration pulses to the indicator multiple as it is operated from even numbered segments 2 to 20 during the automatic wipe-out operation to follow. Relay AWO operated, at transfer contacts 1235, opens the marking circuit to tap switches FS—1 to FS—10 and closes a marking circuit from ground on make contacts 605 on relay PST, Fig. 6, over conductor 9 of cable 602, through break contacts 1208 of relay FP, over conductor 10 of cable 1210, through the make combination of springs 1235 on relay AWO, over conductor 1236, through break contact 1237 of relay WO, over conductor 1238, to armature spring 1239 on relay ET, Fig. 12. Relay AWO operated, at break springs 1271 and 1249, opens the circuits, previously described, to storage indicator units VTC and TUC so that the subsequent wipe-out action will not restore the latter units to blank.

As brush B2 of distributor DR—2 contacts segment 46 of ring R4, a circuit is established from grounded ring R3, through brush B2 and segment 46 of ring R4, over conductor 16 of cable 805, through make contacts 209 of operated relay GA—5, to the winding of solenoid SO—5, Fig. 2, to battery. Solenoid SO—5 and the storage indicator units in row 5 are identical with units indicated for row 1, and like equipment reference numbers apply in both cases. The solenoids SO are designed so that when energized, they rotated cam shafts 210, which in turn bring four contact springs 211, 212, 213 and 214 on the storage indicator units into electrical contact with the contacts 215, 216, 217 and 218 on the storage indicator units, in accordance with the angular setting of the display drums, thereby applying ground 219 to certain of the contact springs, and in turn to certain of the conductors 1 to 48 of cable 220. For a more detailed description of the above operation, reference may be had to the aforesaid Patent 2,302,769. It will be apparent that operation of solenoid SO—5 results in the connection of a plurality of outgoing conductors to ground in accordance with the permutation code on the contacts of the indicators in the selected row, such permutations being in direct relation to the characters displayed on the drums of the indicator units.

In the present instance, an "over" report has been posted on row 5 for the flight 45 at Newark. The posting of an "over" range causes the wipe-out of this flight posting at the previous fix section along the airway, as well as initiating automatic elapsed time circuit operations. In order to locate the previous fix for automatic wipe-out, it is first necessary to ascertain the "in-bound" direction of the flight as posted at the Newark fix section. This is obtained by decoding the coded information stored on the "in-bound," or I—5, unit of the display in row 5 of the Newark fix section. As the flight is progressing in a northward direction, indicator I—5 will be displaying the digit 8, and as solenoid SO—5 operates, conductors 38 and 39 of cable 220 will be grounded in accordance with the permutation code on the storage contacts of indicator I—5. Tracing these grounded conductors in cable 220, it will be found that conductor 38 terminates at the winding of relay IBT—2, Fig. 4, and conductor 39 terminates at the winding of relay IBT—3. The other terminal of the IBT relay windings is connected to battery and therefore relays IBT—2 and IBT—3 are operated as long as solenoid SO—5 is operated. The right hand, or locking, windings of relays IBT—2 and IBT—3 are associated, through conductor 60 of cable 406, with the retransmission equipment indicated diagrammatically at 400, and are not energized at this time.

As relays IBT—2 and IBT—3 operate, a circuit is established from ground on break contacts 401 of relay IBT—1, through make contacts 402 of operated relay IBT—2, make contacts 403 of operated relay IBT—3, break contacts 404 of relay IBT—4, over conductor 1 of cable 405, to the winding of direction relay N, Fig. 12, to battery. Relay N operates and locks over its make contacts 1241 to make contacts 1242 of operated relay AWO, to ground.

Relay N operated, extends the ground circuit previously traced to armature spring 1239 of relay ET, to the #1 contacts of tap switches FS—1 to FS—10 where it will next condition the flight locator circuit to search for flight 45 in the Philadelphia fix section of the display board. The circuit may be traced from grounded break spring 1239 of relay ET, Fig. 12, through make spring 1243 of operated relay N, over conductor 11 of cable 1202, to wiper arm 1143 of bank I on rotary switch RS—1, Fig. 11. This wiper arm will be positioned to bank contact 1144, since the switch RS—1 was positioned to this contact as fix 2 (Newark) was received on the incoming message. The circuit is, therefore, extended through contact 1144 of bank I on switch RS—1, to conductor 1 of cable 1124, which terminates on the No. 1 contacts of tap switches FS—1 to FS—10, Fig. 6. It will thus be apparent that the operation of relay N, in combination with the established position of switch RS—1 for the "over" posting, has automatically conditioned the equipment to locate the posting to be wiped out at the previous fix section, viz., fix 1 (Philadelphia).

As brush B2 of distributor DR—2 contacts segment 52 of ring R4, relay RL—3 is operated over a circuit previously described. Relay RL—3 operated, causes the release of operated relays in a manner hereinbefore described, including relay AGR, Fig. 6. Note that the locking circuits for the fix relay FX—2, and relays EM and PST, Fig. 6, are not opened at this time, since the normal locking circuit from break contacts on relay RL—3 has been supplemented by a ground circuit from make contacts 1234 and 1272 of operated relay AWO. Relays FX—2, EM and PST will remain operated as a result. Also, the locking circuit for the first and second digit identification decoding groups of relays, 1I—1 to 1I—5 and 2I—1 to 2I—5, Fig. 9, has been supplemented by a battery circuit from make contacts 1248 of operated relay AWO, so that the identification digits 45 as stored on these relay groups, are retained, even though relay RL—3 has operated.

When relay AGR released as relay RL—3 operated, the operate circuit to gang relay GA—5, Fig. 2, was interrupted as make contacts 633 of relay AGR of Fig. 6 were opened. Release of relay AGR restores the stepping circuit of flight locator switch RS, Fig. 6, which proceeds to step over a circuit previously described until relay AGR is re-operated under control of tap switch FS—8 as agreement is found in row 8 of the display board. Relay GA—8 is operated in a manner similar to that previously described, as relay AGR is re-operated. Relay GA—8 operated, connects the display indicators in row 8 of the Philadelphia fix section to the pulsing multiple, in preparation for the wipe-out of the display in this row during the succeeding revolution of distributor DR—2 brush arm.

As distributor brush B2 contacts segments 53 of ring R4 on distributor DR—2, a circuit is established from grounded ring R3, through brush B2 and segment 53 of ring R4, over conductor 5 of cable 801, through make contacts 2144 of operated relay AWO, Fig. 12, to the winding of relay CMP, to battery. Relay CMP operates and locks over its make contacts 1245, to make contacts 1246 of operated relay AWO, to ground. Relay CMP operated, by means of its make contacts 1247, grounds conductor 14 of cable 805. This ground is extended through operated relay GA—8 (through contacts corresponding to contacts 221 on relay GA—1) over conductor 22 of cable 201, to the wiper arms of storage indicators VTS—8 and VUS—8, Fig. 7. Indicators VTS—8 and VUS—8 are similar to units VTS—1 and VUS—1 and like reference numbers will apply.

It will be recalled that the "over" posting at the Philadelphia fix section of the display board for row 8, flight 45, was assumed to be 12, indicating that flight 45 had passed over Philadelphia fix at 12 minutes after the hour. It has also been explained that the VTS—8 and VUS—8 storage indicators will have been pulsed in parallel with the "over" range display board indicators for row 8 of the display board. Storage indicator unit VTS—8 will be positioned to bank contact 1 and unit VUS—8 will be positioned to bank contact 2. The ground on wiper arm 700 of storage indicator VTS—8 will be extended through bank contact 1, over conductor 1 of cable 701, to bank contact 1 of bank B on rotary switch RS—3, Fig. 7. The ground on wiper arm 702 of storage indicator unit VUS—8 will be extended through bank contact 2, over conductor 2 of cable 703 to the Number 2 bank contact of bank D on rotary switch RS—4, Fig. 7.

Relay CMP operated, has established a circuit from ground on make contacts 1249 of relay CMP, over conductor 13 of cable 602, through break contacts 704 of relay CO—3A, Fig. 7, through interrupter springs 705 of rotary switch RS—3, to the winding of switch RS—3, to battery. Rotary switch RS—3 is stepped over self-interrupted pulses until the wiper arm of bank B contacts grounded contact 1. At this time, a circuit is completed from grounded contact 1 on bank B, through the wiper arm of bank B, to the winding of relay CO—3A, to battery. Relay CO—3A is operated and locks over its make contacts 706 to grounded conductor 13 of cable 602. The operation of relay CO—3A has opened the stepping circuit for rotary switch RS—3 at break contacts 704 of relay CO—3A, and switch RS—3 remains positioned to its #1 bank contacts. Over similar circuits, rotary switch RS—4 is positioned to bank contacts 2, under control of the grounded #2 contact of bank D, and relay CO—4A. The foregoing operations have served to position rotary switch RS—3 to the setting corresponding to the tens digit of "over" time as displayed in row 8, and to position rotary switch RS—4 to the setting corresponding to the units digit of "over" time as displayed in row 8 of the display board.

The operation of relays CO—3A and CO—4A has established a circuit from battery, through make contacts 634 of operated relay AGR, over conductor 2 of cable 602, through make contacts 707 of operated relay CO—4A, through make contacts 708 of operated relay CO—3A, over conductor 12 of cable 602, through make contacts 1251 of operated relay AWO, over conductor 1 of cable 1210, to the winding of start magnet SM—2 of distributor DR—2, to ground. With the operation of SM—2, the brush arm of distributor DR—2 makes a second revolution and the indicators in row 8 of the display board are pulsed to their blank settings under control of relay RST in a manner similar to that hereinbefore described. Note that as relay AG is operated from segment 22 of ring R4 on distributor DR—2, the circuit to operate relay RST is opened at break contacts 808 of relay AG so that relay RST will not generate actuation pulses from even numbered segments 30 to 42, and therefore no actuation pulses are transmitted to the indicators after they have been set to their blank positions.

As brush B2 of distributor DR—2 contacts segment 44 of ring R4, a circuit is established from grounded ring R3, through brush B2 and segment 44 of ring R4, over conductor 6 of cable 801, through make contacts 1254 of operated relay AWO, to the winding of relay ET, to battery. Relay ET operates and locks over its make contacts 1255 to make contacts 1242 of operated relay AWO, to ground. Relay ET operated, at its transfer contacts 1215, opens the ground circuit to ring R3 of distributor DR—2 and closes a ground circuit to ring R2 of distributor DR—2. The circuit may be traced from ground, through make contacts 1215 of operated relay ET, over conductor 2 of cable 1216, to ring R2 of distributor DR—2. Thus, with relay ET operated, circuits from ring R1 on distributor DR—2 will become operative and circuits from ring R4 will be inoperative. Relay ET operated, at transfer contacts 1239, returns the flight locator marking ground circuits for tap switches FS—1 to FS—10, to the control of bank J on rotary switch RS—1. The circuit may be traced from ground through make contacts 605 of relay PST, over conductor 9 of cable 602, through break contacts 1208 of relay FP, make contacts 1235 of operated relay AWO, over conductor 1236, through break contacts 1237 on relay WO, over conductor 1238, through make contacts 1239 of operated relay ET, over conductor 12 of cable 1202, to the wiper arm of bank J on rotary switch RS—1. Rotary switch RS—1 is still positioned to the setting where FX—2 relay (Newark) has originally stopped its stepping action, so that the ground on bank J wiper arm will be extended over conductor 2 of cable 1124 to the #2 contacts of tap switches FS—1 to FS—10. Therefore, when relay AGR is released by the operation of relay RL—3, as brush B1 contacts segment 45 of ring R1, the flight locator circuits will again function in known manner to reoperate relay GA—5.

*"Elapsed time" posting*

With the third revolution of distributor DR—2 brush arm, the elapsed time will be posted on ET—5 and EU—5 indicators in row 5 of the Newark fix section of the display board. Returning now to the operated relay CMP, a circuit was established from ground, through make contacts 1250 of operated relay CMP, over conductor 14 of cable 602, to the wiper arms of storage indicator units VTC and VUC, Fig. 7. It will be recalled that these units were positioned to the settings corresponding to the "over" time posted on the Newark fix section. The ground on the wiper arm of bank B of indicator unit VUC will be extended through bank contact 1, over conductor 1 of cable 709, to the winding of relay R—1, to battery, causing relay R—1 to operate. The ground on the wiper arm of bank A on indicator unit VTC will be extended through bank contact 3, over conductor 3 of cable 710, to ground bank contact 3 of bank A on rotary switch RS—3. Another circuit from ground on the wiper arm of bank A on indicator unit VUC is extended through bank contact 1 of bank A, over conductor 1 of cable 711, to ground bank contact 1 of bank B on rotary switch RS—4.

As the brush arm of distributor DR—2 makes its third revolution, following the operation of relays AGR and GA—5, relay ETA, Fig. 7, is pulsed from even numbered segments 2 to 20 on ring R1 of distributor DR—2. The circuit may be traced from grounded ring R2, through brush B1 and even numbered segments 2 to 20 on ring R1 of distributor DR—2, over conductor 4 of cable 712, to the winding of relay ETA, to battery. Relay ETA thereby generates ten restoration pulses which serve to restore the indicators in the "elapsed time" range of the selected row on the display board to their blank setting. The circuit to the tens digit indicator, ET—5, may be traced from battery through make contacts 713 of relay ETA, through break contacts 714 of relay CO—3B, over conductor 11 of cable 805, through make contacts (same as contacts 222 on relay GA—1) of operated relay GA—5, to the winding of display indicator ET—5. The circuit to indicator unit EU—5 is similar. In the assumed example, the indicator units ET—5 and EU—5 will have been at their blank settings and therefore the ten restoration pulses described above will have no effect, since the circuits will be open at the break contacts 203 of the indicator units.

Figure 3:
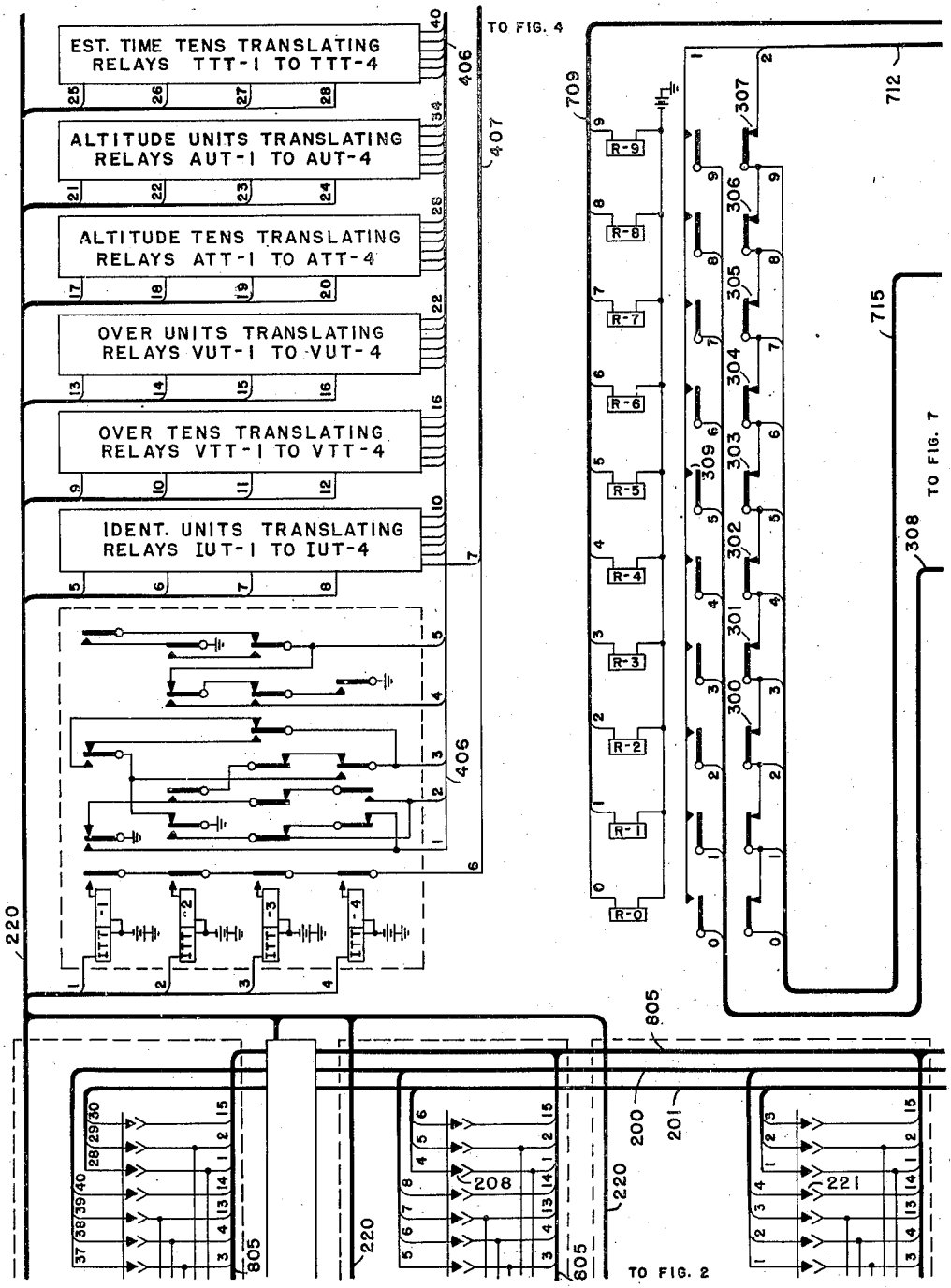
Fig. 3 illustrates the remainder of the display board of Fig. 2, and a portion of the groups of translating storage relays associated with the storage display indicators, as well as a group of comparison relays used in the automatic elapsed time calculator.

As brush B1 of distributor DR—2 contacts segment 11 of ring R1, a circuit is established from ground on ring R2, through brush B1 and segment 11 of ring R1, over conductor 811, to the wiper arm of bank A on rotary switch RS—4, through bank contact 2, over conductor 2 of cable 715, through break contacts 300, 301, 302, 303, 304, 305, 306, 307 of comparison relays R—2, R—3, R—4, R—5, R—6, R—7, R—8 and R—9 respectively, Fig. 3, over conductor 2 of cable 712 to the winding of relay BT, Fig. 7, to battery. Relay BT operates and locks through its make contacts 716 to grounded conductor 13 of cable 602. The comparison relays R—0 to R—9 of Fig. 3, and the circuits through their contacts, are so designed that relay BT will operate if the units digit of the first reported "over" time is numerically greater than the units digit of the second reported "over" time. If the units digit of the first "over" time is the same or numerically less than the units digit of the second "over" time, relay BT will be unoperated. In the assumed example, the units digit of the first "over" time in the comparison (12 at Philadelphia) is 2 and the units digit of the second reported "over" time (31 at Newark) is 1, and relay BT is operated. Relay BT operated is an indication that 1 may be "borrowed" from the tens column in making the subtraction of 12 from 31. With relay BT operated, a circuit is established to advance rotary switch RS—3 one step as brush B1 of distributor DR—2 contacts segment 13 of ring R1. The circuit may be traced from grounded ring R2 of distributor DR—2, through brush B1 and segment 13 of ring R1, over conductor 3 of cable 712, through make contacts 717 of operated relay BT, through break contacts 718 of relay CO—3B, to the winding of rotary switch RS—3, to battery. Rotary switch RS—3 is advanced one step so that the wiper arms of its associated banks are now positioned to bank contacts 2.

As brush B1 of distributor DR—2 contacts segment 22 of ring R1, relay AG is operated over a circuit similar to that from segment 22 of ring R4, previously described. Relay AG operated supplied a ground in known manner to the contacts 206 of indicator units in row 5 of the display board so that any pulses delivered to the indicators will now find a completed path, enabling said units to move from their blank settings. Relay AG operated, supplies a ground to make springs 719 and 720 of relay ETA, Fig. 7. The circuit may be traced from ground through make springs 812 of operated relay AG, over conductor 813 to the armature of make springs 719 and 720 on relay ETA.

As brush B1 of distributor DR—2 contacts even numbered segments 24 to 42 of ring R1, relay ETA is pulsed ten times over a circuit hereinbefore described. As relay ETA receives the first pulse and operates, a pulse is delivered to the tens digit indicator ET—5, Fig. 2, of the "elapsed time" range in row 5 of the display board over a circuit previously described and it is stepped from the blank position to display the digit 1. Concurrently, rotary switch RS—3 is also advanced one step by a circuit from ground at make springs 719 of relay ETA, through break springs 718 of relay CO—3B, to the winding of switch RS—3, to battery. Rotary switch RS—3 will now be in the position where its wiper arms are contacting bank contacts 3. However, bank contact 3 of bank A is grounded by a circuit previously described, and this ground will now be extended over wiper arm of bank A to the winding of relay CO—3B, to battery. Relay CO—3B operates and locks over its make contacts 721, to grounded conductor 13 of cable 602. The operation of relay CO—3B, at its break contacts 714 and 718, has opened the pulsing circuits from relay ETA to indicator unit ET—5 and rotary switch RS—3. It will be evident that the indicator unit ET—5 will receive but one of the ten actuation pulses generated by relay ETA and will, therefore, remain positioned to display the digit 1.

Over similar circuits, indicator unit EU—5 and rotary switch RS—4 are stepped concurrently by pulses from relay ETA until the wiper arm of bank B on rotary switch RS—4 contacts grounded bank contact 1, at which time relay CO—4B is operated and opens the pulsing circuits to indicator EU—5 and rotary switch RS—4. Since the wiper arms of rotary switch RS—4 were originally positioned to bank contacts 2, it required 9 steps to be positioned to bank contacts 1, where the circuit to operate relay CO—4B was established. Therefore, indicator unit EU—5 will have received 9 pulses and will accordingly be positioned to display the digit 9.

At this point, the operations resulting from the assumed incoming message have been completed, the "over" time digits 31 have been posted in row 5 of the Newark fix section, the flight posting in row 8 of the Philadelphia fix section has been wiped out, and the elapsed time 19 has been calculated and posted in the "elapsed time" range on row 5 of the Newark fix section.

It should be explained here that if the units digit of elapsed time is 0 (as for example, if the first "over" time were 25 and the second over time were 35), a circuit would be established to operate relay UZ, Fig. 11. Assume rotary switch RS—4 has been positioned to bank contacts 5, and that indicator unit VUC also has its wipers positioned to bank contacts 5, as would be the case if the two "over" times were 25 and 35 respectively. Relay R—5, Fig. 7, would then be operated over a circuit similar to the one previously described. As conductor 811 was grounded from segment 11 of ring R1 on distributor DR—2, a circuit would be established through wiper arm of bank C on switch RS—4, over bank contact 5 and conductor 5 of cable 308, through make contacts 309 of operated relay R—5, over conductor 1 of cable 712, to the winding of relay UZ, Fig. 7, to battery. Relay UZ locks over its own make contacts to grounded conductor 13 of cable 602. The operation of relay UZ shunts the break contacts 722 of relay CO—4B at make contacts 723 of relay UZ. The result is that the operation of relay CO—4B is made ineffective and a full ten actuation pulses are transmitted to indicator EU under the special condition where the "elapsed time" units digit is 0. This is necessary because, with both rotary switch RS—4 and indicator unit VUC positioned to the same numerical bank contact, relay CO—4B is immediately operated and would prevent any actuation pulses from reaching display indicator unit EU.

Returning to the operations following the above detailed description of the elapsed time posting, as distributor brush B1 contacts segment 43 of ring R1 on distributor DR—2, a circuit is established from ground on ring R2, through brush B1 and segment 43 of ring R1, over conductor 3 of cable 801, through make contacts 1256 of operated relay ET, over conductor 1257, through make contacts 1258 of operated relay AWO, to the #2 winding of relay AWO, to battery. Winding #1 and winding #2 of the relay AWO are connected in similar manner to relay FP windings, i. e., the magnetic fields developed by the windings are opposed to each other, so that when both windings are energized relay AWO releases.

The release of relay AWO opens the locking circuit to relays ET and N at make contacts 1242 of relay AWO. Release of relay ET opens the ground connection to ring R2 of distributor DR—2 and closes the ground connection to ring R3 at transfer contacts 1215 of relay ET. From this point, operations are similar to those hereinbefore described, the circuits from ring R4 of distributor DR—2 performing their usual functions and the equipment is returned to its normal idle condition as the brush arm of distributor DR—2 completes its third and final revolution.

*Manual wipe-out*

Provision has been made for wipe-out of all information in any item row of the display board by means of local teleprinter operation. Such an operation would be necessary in the event a flight plan already displayed on the progress board were cancelled, or to wipe-out the display at the final fix section of a control area where the automatic wipe-out feature would not apply.

To initiate such a wipe-out operation, the local operator at teleprinter 3 would transmit a message containing the identification number and fix section number of the flight in question in the same manner as hereinbefore described. The range character 6 would be transmitted in advance of the fix section number and the message would be terminated by the standard end-of-message character. As this message is connected by the seeker to the common posting equipment, operations under control of distributor DR—1 are identical to those previously described up to the point where the character 6 is stored on the range decoding relays R—1 to R—5, Fig. 10. Operation of relays R—1, R—3, and R—5, corresponding to the code for digit 6, completes a circuit, through pyramidal contacts on relays R—1 to R—5, to operate relay WO, Fig. 12. The circuit may be traced from ground, through break springs 1009 of relay R—2, through break springs 1010 of relay R—4, through make springs 1039 of relay R—3, make springs 1040 of relay R—5, make springs 1042 of relay R—1, over conductor 1 of cable 1021, to the winding of relay WO, to battery. Relay WO locks over its make contacts 1258 to break contacts 1259 on relay RL—3. With relay WO operated, a circuit is established to energize the #1 winding of relay AWO as soon as relay PST, Fig. 6, is operated when the end-of-message signal is decoded. The circuit may be traced from ground, through break contacts 814 of relay AG, Fig. 8, over conductor 7 of cable 602, through make contacts 635 of relay PST, over conductor 8 of cable 602, through make contacts 1260 of operated relay WO, over conductor 4 of cable 1021, to the #1 winding of relay AWO, to battery. Relay AWO is thereby operated before the start of the first revolution of the brush arm on distributor DR—2 and conditions the wipe-out of the posting at the selected row of the display board in a manner previously described.

As relay AWO operates, a circuit is established from battery, through make contacts 1261 of operated relay WO, over conductor 1262, through make contacts 1251 of operated relay AWO, over conductor 1 of cable 1210, to the winding of start magnet SM—2 on distributor DR—2, to ground. Distributor DR—2 operation initiates the wipe-out of the indicators of the selected row in known manner. As brush B2 of distributor DR—2 contacts segment 47 of ring R4, a circuit will be established through break contacts on the unoperated direction relays N and S of Fig. 12, to energize the #2 winding of relay AWO. Note that no direction relays can be operated, since the indicators in the selected row have already been restored to blank at the time the solenoid SO is operated. The circuit to energize the #2 winding of relay AWO may be traced from grounded ring R3 on distributor DR—2, through brush B2 and segment 47 of ring R4, over conductor 3 of cable 1216, through break contacts 1263 of relay S, through break contacts 1264 of relay N, through make contacts 1258 of relay AWO, to the #2 winding of relay AWO, to battery. Relay AWO is thereby caused to release in known manner and the equipment is returned to normal as distributor DR—2 brush arm completes its revolution.

*Automatic retransmission circuits*

Provision has been made to institute an automatic retransmission to an adjacent control center whenever the "out-bound" direction posted on a "boundary" fix section of a flight progress board indicates that the flight is to enter an adjacent traffic control area. In the present disclosure, Philadelphia, for fix 1, represents the "boundary" fix section of the New York traffic control area and a south "out-bound" direction posted at this fix is an indication that the flight will enter the adjacent Washington traffic control area. The "fringe" fix section of the Washington display board for this flight would, therefore, also be Philadelphia.

Figure 4:
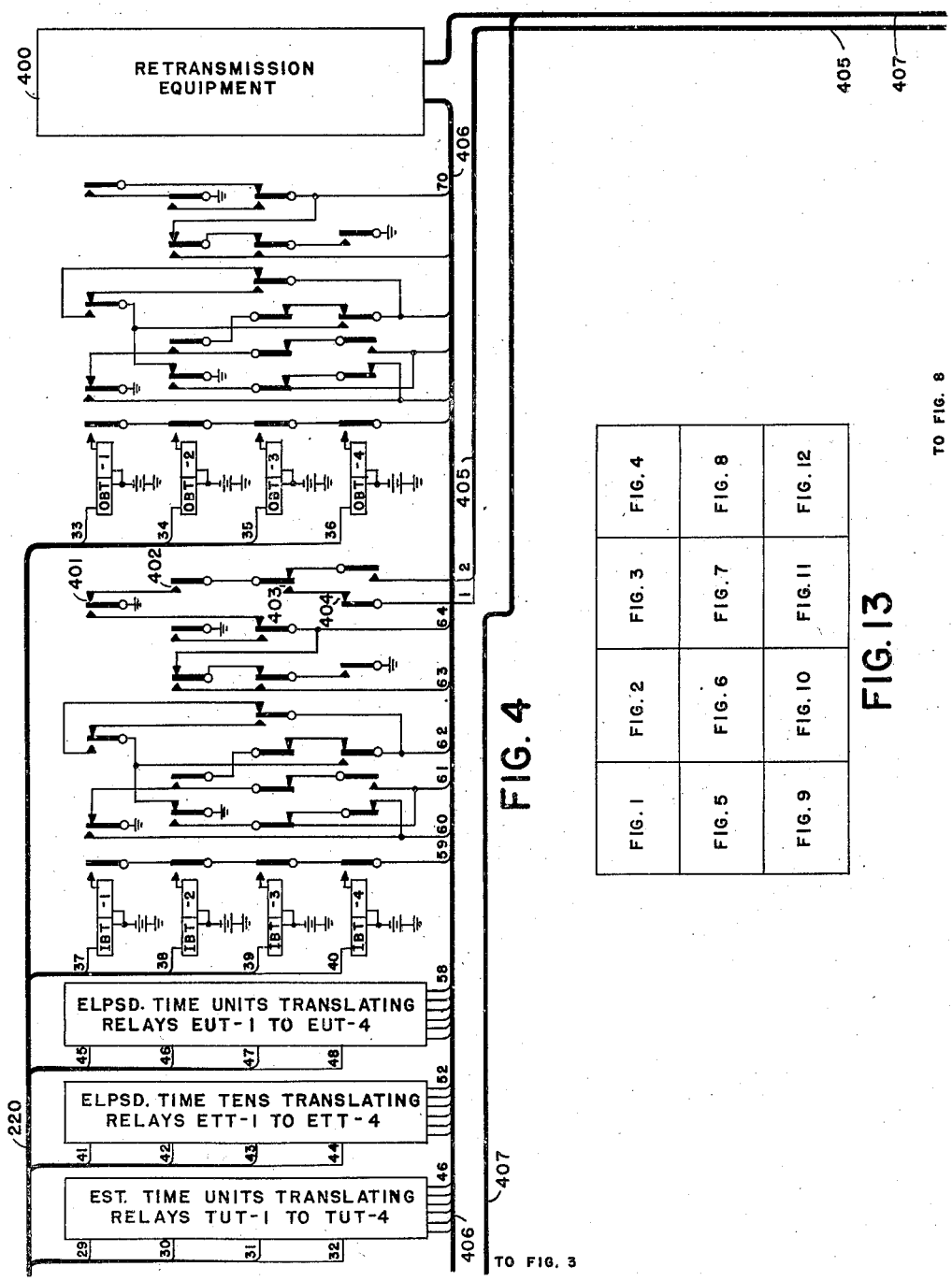
Fig. 4 shows the remainder of the groups of translating storage relays partially shown in Fig. 3, the figure also illustrating diagrammatically retransmission equipment associated therewith.

Assume that an incoming message has caused a posting at the Philadelphia fix section of the New York display board and that an "out-bound" south direction is posted at said fix section as a result. Rotary switch RS—1 of Fig. 11 will have been positioned under control of relay FX—1, Fig. 10, so that wiper arm 1144 of bank G of RS—1 will be in electrical contact with bank G contact 1145, and secondary data storage relay OBS—3, Fig. 12, will be operated to post the digit 4 in the "out-bound" range of the display board. Then, as brush B2 of distributor DR—2 contacts segment 50 of ring R4, a circuit will be established from grounded ring R3 of distributor DR—2, through brush B2 and segment 50 of R4, over conductor 5 of cable 1216, over conductor 8 of cable 1202, through bank contact 1145 and wiper arm 1144 of bank G on switch RS—1, over conductor 7 of cable 1202, through break contacts 1265 of relay OBS—1, break contacts 1266 of relay OBS—2, make contacts 1267 of operated relay OBS—3, break contacts 1268 of relay OBS—4, over conductor 5 of cable 1021, to the #1 winding of relay PR, Fig. 12, to battery. Relay PR operates and locks over its make contacts 1269 and #2 coil, and conductor 4 of cable 407, to the retransmission equipment which is indicated diagrammatically at 400, Fig. 4. The retransmission equipment which is under control of the translating and storage relay groups ITT to OBT of Figs. 3 and 4, is like that described in my copending application Serial No. 576,398, filed February 6, 1945, under the heading entitled "Retransmission to other boards," and illustrated in Figs. 2, 3 and 6 thereof, in which permutation code telegraph printer signals representing existing information displayed on the flight progress board automatically may be retransmitted to other display boards. The disclosure of my aforesaid application in this respect is incorporated herein by reference, and for the sake of simplicity a detailed description thereof is not repeated herein. Briefly, referring to the conductors in cable 407 extending to the retransmitting apparatus 400, conductor 1, Fig. 12, of the cable is connected to a start magnet in the apparatus corresponding to start magnet SM—3 of retransmitting distributor DR—3 shown in Fig. 3 of my aforesaid application; conductor 2 of cable 407 extends to segment 34 of ring R1 of said distributor DR—3; and conductor 3 of cable 407 extends to segment 35 of ring R1 of said distributor. Conductor 4 of the cable extends to the break contacts of a release relay corresponding to relay RL—4 of Fig. 6 of the aforesaid application.

Conductors 6 and 7 of cable 407 are locking leads for the identification tens and units translating relay groups ITT and IUT of Fig. 3 of the instant disclosure. Conductors 8 and 9, Fig. 12, and conductors 10, 11 and 12, Fig. 11, of cable 407 are connected to five groups of data storage relays which are like the three groups of data storage relays VUS—1 to VUS—4, BS—1 to BS—4, and CS—1 to CS—4, shown in Fig. 6 of my aforesaid application.

Conductors 1 to 70 in cable 406, Figs. 3 and 4, correspond to conductors 1 to 30 of cable 250, and conductors 1 to 4 of cable 306, shown in Figs. 2 and 3 of my aforesaid application.

*Operation of message signal circuits*

Provision has been made for the inclusion of a "message" signal, for example, the character —, having code elements 1 and 2 marking, to be inserted immediately after the display board posting portion of a message which may then be followed by a message that will operate a teleprinter at the control center without affecting the display board posting circuits.

Assume that the message received from the pilot of flight 45 reporting over Newark fix had been in the following form: 451231 — Moderate turbulence at 5000 feet L. The portion of the message preceding the character — would be decoded and stored in the posting equipment as described hereinbefore. As the character — appeared over the tape pins of the tape transmitter TTR—2, Fig. 1, relays TR—1 and TR—2, Fig. 5, would be operated in accordance with the code for this character, over circuits previously described. With relays TR—1 and TR—2 operated, a circuit is established from ground, through make contacts 535 of operated relay TR—1, make contacts 536 of operated relay TR—2, break contacts 537 of relay TR—3, break contacts 538 of relay TR—4, break contacts 539 of relay TR—5, to the #1 winding of relay NP, to battery. Relay NP operates and locks over its make contacts 540 and #2 winding, to ground on break contacts 631 of relay EM, Fig. 6.

Relay NP operated, opens the operate circuit for start magnet SM—1 of distributor DR—1 at break contacts 501 of relay NP, causing the brush arm of distributor DR—1 to come to rest. Relay NP operated, at transfer contacts 517, transfers the circuit to the tape step magnet from control of distributor DR—1 to control of distributor 541, associated with teleprinter 542, Fig. 5. Relay NP operated, at transfer contacts 509, 529, 541, 542 and 520, transfers the circuits on make contacts of tape reading relays TR—1, TR—2, TR—3, TR—4 and TR—5 from rings on distributor DR—1 to the control of distributor 541. The distributor 541 clutch magnet is operated over a circuit through conductor 7 of cable 544 and make contacts 543 of operated relay NP, to battery. Operation of teleprinter 542 continues under control of distributor 541 in known manner from the reading relays TR—1 to TR—5. The tape transmitter TTR—2 is now stepped under control of distributor 541.

It will be noted that the message portion which immediately follows the character — is in lower case and therefore requires the letters shift character to precede the text. Since the letters shift character consists of code units 1, 2, 3, 4 and 5 marking, relay LS, Fig. 5, will be operated whenever this character is received on relays TR—1 to TR—5. The circuit may be traced from ground on make contacts 535 of relay TR—1, through make contacts 536 of relay TR—2, make contacts 537 of relay TR—3, make contacts 545 of relay TR—4, make contacts 546 of relay TR—5, to the winding of relay LS, to battery. As a figures shift character is received, relay FS, Fig. 5, operates over a similar circuit through relays TR—1, TR—2, TR—4 and TR—5 operated. Relay FS locks over its make contacts 547 and #2 winding, to ground at break contacts 548 of relay LS. It will be apparent that when the message is in upper case characters, relay FS will be operated and when the message is in lower case characters, relay FS will be unoperated.

As the final character L, or end-of-message, is received, relay FS will, therefore, be in its operated condition. A circuit is thereby established from ground, through break contacts 535 of relay TR—1, break contacts 550 of relay TR—2, make contacts 551 of operated relay TR—3, break contacts 552 of relay TR—4, make contacts 553 of operated relay TR—5, make contacts 549 of operated relay FS, make contacts 554 of operated relay NP, over conductor 555, to the winding of relay EM, to battery. Relay EM operates and the posting operations are accomplished in known manner. Relay EM operated, opens the locking circuit to relay NP at break contacts 631 of relay EM. The circuits are thus restored to normal in preparation for the reception of a new incoming message.

Various modifications of the circuit arrangement and apparatus shown, and the various equivalents or substitutes for the devices illustrated, will readily occur to those versed in the art without departing from the spirit and scope of the present invention. The disclosure, therefore, is for the purpose of illustrating the principles of the invention which is not to be regarded as limited except as indicated by the scope of the appended claims.

What is claimed is:

1. A flight plan expander system for posting information regarding the movements of aircraft, comprising signal-responsive apparatus for posting flight data relative to different fixes to be traversed by said aircraft, a source of posting signals representing a flight plan message including a particular flight designation, at least two reference fix designations representing geographically spaced fixes along an airway and other flight data in regard to an aircraft, apparatus responsive to certain of said signals including the fix designations for automatically expanding said message by inserting therein signals representing the designation of another fix along the airway, and means for causing said expanded message to actuate said signal responsive apparatus to cause multiple postings of at least one of said other flight data in association with the designations respectively of said fixes.

2. A flight plan expander system for posting information regarding the movements of aircraft, comprising signal-responsive apparatus for posting flight data relative to different fixes to be traversed by said aircraft in a given control area, a source of posting signals representing a flight plan message including a particular flight designation, at least two reference fix designations for said control area and other flight data in regard to an aircraft, apparatus responsive to certain of said signals including the reference fix designations for automatically expanding said message by inserting therein signals representing the designation of another fix intermediate said reference fixes, and means for causing said expanded message to actuate said signal-responsive apparatus to cause multiple postings of at least one of said other flight data in association with the designations respectively of said reference and intermediate fixes.

3. A flight plan expander system for posting information regarding the movements of aircraft, comprising signal-responsive apparatus for posting flight data relative to different fixes to be traversed by said aircraft, a source of posting signals representing a flight plan message including a particular flight designation, at least two reference fix designations representing geographically spaced fixes along an airway and other flight data in regard to an aircraft, apparatus responsive to certain of said signals including the fix designations for automatically expanding said message by inserting therein signals representing the designation of another fix along the airway, and means for causing said expanded message to actuate said signal-responsive apparatus to cause multiple postings each of said flight designation and of at least one of said other flight data in association with the designations respectively of said fixes.

4. A flight plan expander system for posting information regarding the movements of aircraft, comprising signal-responsive apparatus for posting flight data relative to different fixes to be traversed by said aircraft in a given control area, a source of posting signals representing a flight plan message including a particular flight designation, at least two reference fix designations for said control area and other flight data in regard to an aircraft, apparatus responsive to certain of said signals including the reference fix designations for automatically expanding said message by inserting therein signals representing the designation of at least one other fix along the flight route which is intermediate said reference fixes, and means for causing said expanded message to actuate said signal-responsive apparatus to cause multiple postings each of said flight designation and at least one of said other flight data in association with the designations respectively of said reference and intermediate fixes.

5. A flight plan expander system for posting information regarding the movements of aircraft, comprising signal-responsive apparatus for posting flight data relative to different fixes to be traversed by said aircraft, a source of posting signals representing a flight plan message including a particular flight designation, at least two reference fix designations and altitude data in regard to an aircraft, apparatus responsive to certain of said signals including the reference fix designations for automatically expanding said message by inserting therein signals representing the designation of at least one intervening fix along the flight route, and means for causing said expanded message to actuate said signal-responsive apparatus to cause multiple postings of said altitude data in association with the designations respectively of said fixes.

6. A flight plan expander system for posting information regarding the movements of aircraft, comprising an announcing board having a plurality of signal-responsive posting devices assignable at different times to different flights respectively of said aircraft, and arranged in groups respectively identified with different fixes traversed by the aircraft, each posting device including a plurality of means respectively actuatable to different settings for posting a plurality of data concerning one of said aircraft, a source of message posting signals representing a flight plan message including a particular flight designation, a flight plan signal, at least two reference fix designations and flight data in regard to an aircraft, apparatus responsive to said flight plan signal and reference fix designations for automatically expanding said message by inserting therein signals representing the designation of another fix along the flight route, and means for causing said expanded message to select and actuate a particular posting device in the announcing board group identified with said another fix to post thereon certain of said flight data.

7. A flight plan expander system for posting information regarding the movements of aircraft, comprising an announcing board having a plurality of signal-responsive posting devices assignable at different times to different flights respectively of said aircraft, and arranged in groups respectively identified with different fixes traversed by the aircraft, each posting device including a plurality of means respectively actuatable to different settings for posting a plurality of data concerning one of said aircraft including its flight altitude data, a source of message posting signals representing a flight plan message including a particular flight designation, a flight plan signal, at least two reference fix designations and flight altitude data in regard to an aircraft, apparatus responsive to said flight plan signal and reference fix designations for auotmatically expanding said message by inserting therein signals representing the designation of another fix along the flight route, and means for causing said expanded message to select and actuate a particular posting device in the announcing board group identified with said another fix to post thereon said altitude data.

8. A system for posting information regarding the movements of aircraft, comprising signal-responsive apparatus for posting flight data relative to different fixes to be traversed by said aircraft in a given control area, a source of posting signals representing a message including a particular flight designation and a plurality of fix designations for said control area, apparatus responsive to said fix designations for automatically initiating signals representing the direction of flight of said aircraft at each of said fixes, and means for causing said last named signals to actuate said signal-responsive apparatus to post said flight direction data in association with the designations respectively of said fixes.

9. A system for posting information regarding the movements of aircraft, comprising signal-responsive apparatus for posting flight data relative to different fixes to be traversed by said aircraft in a given control area, a source of posting signals representing a message including a particular flight designation and a plurality of fix designations for said control area, apparatus responsive to said fix designations for automatically initiating signals representing the in-bound direction of flight of said aircraft at certain of said fixes, and means for causing said last named signals to actuate said signal-responsive apparatus to post said in-bound flight direction data in association with the designations respectively of said certain of said fixes.

10. A system for posting information regarding the movements of aircraft, comprising signal-responsive apparatus for posting flight data relative to different fixes to be traversed by said aircraft in a given control area, a source of posting signals representing a message including a particular flight designation and a plurality of fix designations for said control area, apparatus responsive to said fix designations for automatically initiating signals representing the out-bound direction of flight of said aircraft at certain of said fixes, and means for causing said last named signals to actuate said signal-responsive apparatus to post said out-bound flight direction data in association with the designations respectively of said certain of said fixes.

11. A system for posting information regarding the movements of aircraft, comprising signal-responsive apparatus for posting flight data relative to different fixes to be traversed by said aircraft, a source of posting signals representing a flight plan message including a particular flight designation, at least two reference fix designations and other flight data in regard to an aircraft, apparatus responsive to certain of said signals including the reference fix designations for automatically expanding said message by inserting therein signals representing the designation of at least one intervening fix along the flight route, means for causing said expanded message to actuate said signal-responsive apparatus to cause multiple postings of at least one of said other flight data in association with the designations respectively of said fixes, means responsive to said reference fix designations for initiating signals representing the direction of flight of said aircraft at each of the fixes, and means for causing said last named signals to actuate said signal-responsive apparatus to post said flight direction data in association with the designations respectively of said fixes to which said flight direction data apply.

12. A system for posting information regarding the movements of aircraft, comprising an announcing board having a plurality of signal-responsive posting devices assignable at different times to different flights respectively of said aircraft, and arranged in groups respectively classified in regard to different fixes traversed by the aircraft, each posting device including a plurality of means respectively actuatable to different settings for posting a plurality of data concerning one of said aircraft, a source of message posting signals comprising a flight designation, a plurality of fix designations, flight data in regard to an aircraft and a repeat signal, and apparatus responsive to said fix designation and repeat signals for automatically effecting posting of identical data in a plurality of said fix groups of the announcing board.

13. A system for ascertaining elapsed time information regarding the movements of aircraft, comprising a plurality of signal storage devices assignable at different times to different flights respectively of said aircraft, and arranged in groups respectively assignable to different fixes traversed by the aircraft, each storage device including a plurality of means respectively actuatable to different settings for storing signals representing a plurality of data concerning one of said aircraft, said data including the time at which the aircraft passed over a preceding fix along the flight route and the in-bound direction data for a succeeding fix over which the aircraft currently is reported, a source of message signals comprising the flight designation of the aircraft, the designation of said succeeding fix over which the aircraft is reported and its "over" time for said succeeding fix, and apparatus controlled by said stored in-bound direction data and responsive to said succeeding fix and "over" signals for locating the storage device assigned to said flight in said preceding fix group, means for comparing automatically the "over" times stored in the preceding and succeeding fix groups to determine the difference between the two "over" times and for generating signals representing the elapsed time data thus ascertained, and means responsive to said last named signals for storing the elapsed time data.

14. A system for ascertaining and posting elapsed time information regarding the movements of aircraft, comprising a plurality of signal-responsive indicator devices assignable at different times to different flights respectively of said aircraft, and arranged in groups respectively assignable to different fixes traversed by the aircraft, each indicator device including a plurality of indicator means respectively actuatable to different settings for posting a plurality of data concerning one of said aircraft, said data including the "over" time of the aircraft at a preceding fix along the flight route, the in-bound direction data for a succeeding fix over which the aircraft currently is reported, the "over" time for said succeeding fix and the elapsed time of the flight between said fixes, a source of message signals comprising the flight designation of the aircraft, the designation of said succeeding fix over which the aircraft is reported and its "over" time for said succeeding fix, and apparatus controlled by said posted in-bound direction data and responsive to said flight designation and said succeeding fix and "over" signals for locating the indicator device assigned to said flight in said preceding fix group, means for comparing automatically the "over" times posted on the indicator devices in the preceding and succeeding fix groups to determine the difference between the two "over" times and for generating signals representing the elapsed time data thus ascertained, and means responsive to said last named signals for posting the elapsed time data on the indicator device in said succeeding fix group.

15. A system for ascertaining and posting elapsed time information regarding the movements of aircraft, comprising a plurality of signal-responsive indicator devices assignable at different times to different flights respectively of said aircraft, and arranged in groups respectively assignable to different fixes traversed by the aircraft, each indicator device including a plurality of means respectively actuatable to different settings for posting a plurality of data concerning one of said aircraft, said data including the "over" time of the aircraft at a preceding fix along the flight route, the in-bound direction data for a succeeding fix over which the aircraft currently is reported, the "over" time for said succeeding fix and the elapsed time of the flight between said fixes, a source of message signals comprising the flight designation of the aircraft, the designation of said succeeding fix over which the aircraft is reported and its "over" time for said succeeding fix, and apparatus controlled by said posted in-bound direction data and responsive to said flight designation and said succeeding fix and "over" signals for locating the indicator device assigned to said flight in said preceding fix group, means for comparing automatically the "over" times posted on the indicator devices in the preceding and succeeding fix groups to determine the difference between the two "over" times and for generating signals representing the elapsed time data thus ascertained, means responsive to said last named signals for posting the elapsed time data on the indicator device in said succeeding fix group, and means automatically responsive to the reception of said message signals for actuating the indicator device in said preceding fix group to delete flight data posted thereon.

16. A system for storing and retransmitting information regarding the movements of aircraft in traversing a plurality of airway traffic control areas, comprising a plurality of signal storage devices assignable at different times to different flights respectively of said aircraft, and arranged in groups respectively identified with different fixes including a boundary fix for one of said control areas traversed by the aircraft, each storage device including a plurality of means respectively actuatable to different settings for storing signals representing a plurality of data concerning one of said aircraft including the out-bound direction data for said boundary fix, a source of incoming message signals for actuating selected ones of said signal storing means to store the message, an outgoing transmission circuit, and means controlled by said out-bound direction data storage means and automatically responsive to the reception of said message, for selecting and retransmitting over said outgoing circuit posting signals comprising that portion of the message which is pertinent to said boundary fix group of storage devices for posting said portion of the message in another control area.

17. A system for storing and retransmitting information regarding the movements of aircraft through a plurality of airway traffic control areas, comprising a plurality of signal storage devices assignable at different times to different flights respectively of said aircraft, and arranged in groups respectively identified with different fixes including a boundary fix for one of said control areas traversed by the aircraft, each storage device including a plurality of means respectively actuatable to different settings for storing signals representing a plurality of data concerning one of said aircraft including the out-bound direction data for said boundary fix, a source of incoming message signals for actuating selected ones said signal storing means in said boundary fix group, an outgoing transmission circuit, and means controlled by said out-bound direction data storage means and automatically responsive to the reception of said message by the boundary fix storage device for retransmitting over said outgoing circuit posting signals comprising the data received by said boundary fix storage device for posting said data in another control area.

18. A system for posting information regarding the movements of aircraft, comprising an announcing board having a plurality of signal-responsive display indicator devices assignable at different times to different flights respectively of said aircraft, and arranged in groups respectively identified with different fixes traversed by the aircraft, each indicator device including a plurality of means respectively actuatable to different settings for displaying a plurality of data concerning one of said aircraft, a telegraph receiving device for posting additional information not to be displayed on said indicator devices, a source of incoming posting signals for actuating said display indicator devices and including other signals comprising said additional information preceded by a transfer signal and followed by an end-of-message signal, and apparatus selectively responsive to said transfer signal for causing said other signals to be received by said telegraph receiving device instead of by said display indicators.

19. A system for posting information regarding the movements of aircraft comprising an announcing board having a plurality of signal-responsive display indicator devices assignable at different times to different flights respectively of said aircraft, and arranged in groups respectively identified with different fixes traversed by the aircraft, each indicator device including a plurality of means respectively actuatable to different settings for displaying a plurality of data concerning one of said aircraft, a telegraph receiving device for posting additional information not to be displayed on said indicator devices, a source of incoming posting signals for actuating said display indicator devices and including other signals comprising said additional information preceded by a transfer signal and followed by an end-of-message signal, a plurality of signal reading elements selectively responsive to said transfer signal, and circuit means controlled by said signal reading elements for causing said other signals to be received by said telegraph receiving device instead of by said display indicators.

EDWIN L. SCHMIDT.

REFERENCES CITED

The following references are of record in the file of this patent:

UNITED STATES PATENTS

| Number | Name | Date |
|---|---|---|
| 1,992,945 | Haselton | Mar. 5, 1935 |
| 2,246,449 | Marshall | June 17, 1941 |
| 2,386,743 | May | Oct. 9, 1945 |
| 2,391,469 | Marshall | Dec. 25, 1945 |